(12) United States Patent
Ebihara et al.

(10) Patent No.: US 7,801,873 B2
(45) Date of Patent: Sep. 21, 2010

(54) INFORMATION PROCESSING APPARATUS, INFORMATION PROCESSING METHOD, RECORDING MEDIUM, PROGRAM, AND DATA

(75) Inventors: Munetake Ebihara, Kanagawa (JP); Manabu Kii, Tokyo (JP); Takamichi Hayashi, Tokyo (JP); Masahiro Shimizu, Saitama (JP)

(73) Assignee: Sony Corporation, Tokyo (JP)

( * ) Notice: Subject to any disclaimer, the term of this patent is extended or adjusted under 35 U.S.C. 154(b) by 476 days.

(21) Appl. No.: 10/940,614

(22) Filed: Sep. 15, 2004

(65) Prior Publication Data

US 2005/0086681 A1 Apr. 21, 2005

(30) Foreign Application Priority Data

Oct. 7, 2003 (JP) ............................. 2003-348666

(51) Int. Cl.
*G06F 7/00* (2006.01)
(52) U.S. Cl. ................... 707/705; 707/790; 707/802
(58) Field of Classification Search ............... None
See application file for complete search history.

(56) References Cited

U.S. PATENT DOCUMENTS

| 6,356,902 B1 * | 3/2002 | Tan et al. ................... 707/10 |
| 7,043,088 B2 * | 5/2006 | Chiu et al. .................. 382/233 |
| 2002/0147728 A1 * | 10/2002 | Goodman et al. ........ 707/104.1 |

FOREIGN PATENT DOCUMENTS

| EP | 1 326 244 A2 | 7/2003 |
| JP | 8-16612 | 1/1996 |
| JP | 9-297770 | 11/1997 |
| JP | 2003-44192 | 2/2003 |
| WO | WO 01/14948 A2 | 3/2001 |
| WO | WO 0114948 A2 * | 3/2001 |

OTHER PUBLICATIONS

"Visteon MACH® MP3 Music System", Internet Article, 'Online!, URL:support.evisteon.com/uploads/us_documents/mp3_user_manual.pdf>, XP-002312651, 2001, pp. 6-11.
"RioVolt SP250? User Guide", Internet Article, 'Online!, URL:http://www.amazon.com/exec/obidos/tg/detail/-B00005QXWI/002-4527513-6391248? v=glance>, XP-002312652, Jul. 1, 2001, pp. 1-35.

* cited by examiner

*Primary Examiner*—Tim T. Vo
*Assistant Examiner*—Hasanul Mobin
(74) *Attorney, Agent, or Firm*—Oblon, Spivak, McClelland, Maier & Neustadt, L.L.P.

(57) ABSTRACT

An information processing apparatus is disclosed which handles content items categorized in a predetermined number of groups. The apparatus includes group number attaching means for attaching to the groups a series of group numbers made up of natural numbers starting from 1; and depth information attaching means for attaching depth information 1 to the group having the group number 1. If a given group with a group number N which is a natural number has depth information "a" which is also a natural number, then the depth information attaching means attaches the depth information formed by a natural number which is at least 1 and not more than a+1 to the group having the group number N+1.

16 Claims, 21 Drawing Sheets

F I G. 5

| CONTENT FILE NO. | CONTENT FILE | NAME |
|---|---|---|
| 1 | aaa | AAAA |
| 2 | bbb | BBBB |
| 3 | ccc | CCCC |
| 4 | ddd | DDDD |
| ... | ... | ... |

F I G. 6

| GROUP NO. | RANGE OF CONTENT FILE NOS. | NAME | DEPTH |
|---|---|---|---|
| 1 | 1 | α | 1 |
| 2 | 2 | β | 1 |
| 3 | — | γ | 2 |
| 4 | 3-4 | δ | 2 |
| 5 | 5-6 | ε | 1 |
| ... | ... | ... | ... |

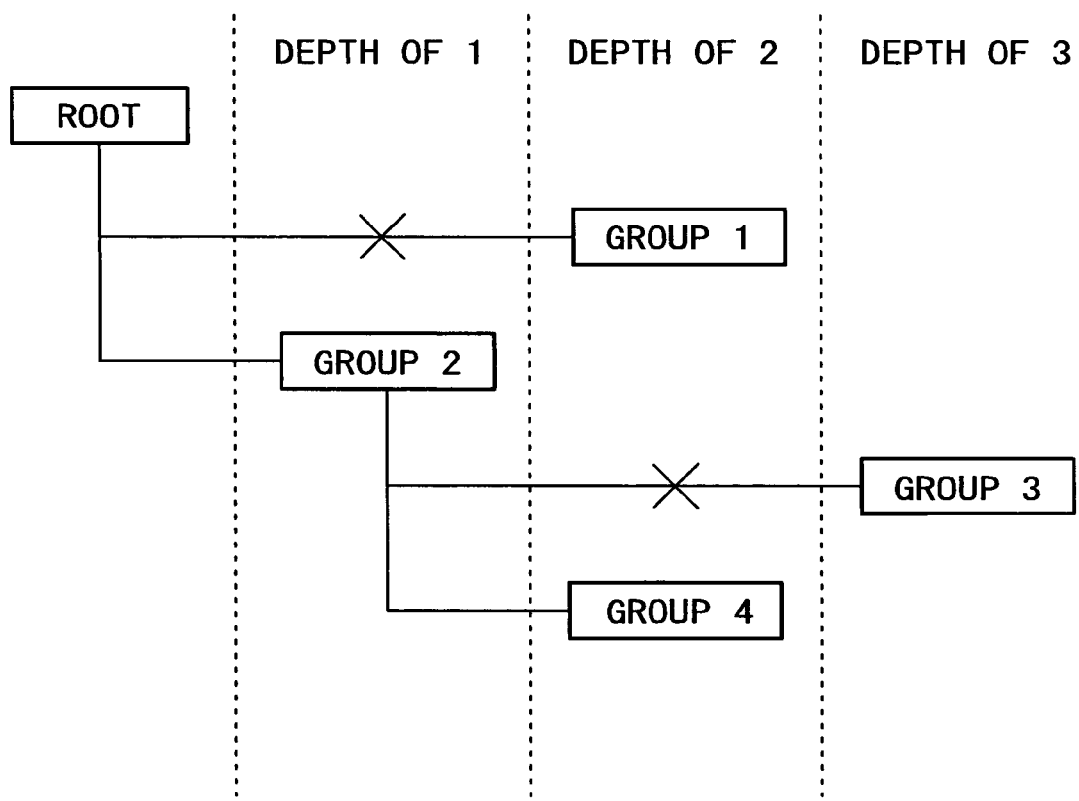
F I G. 1 5

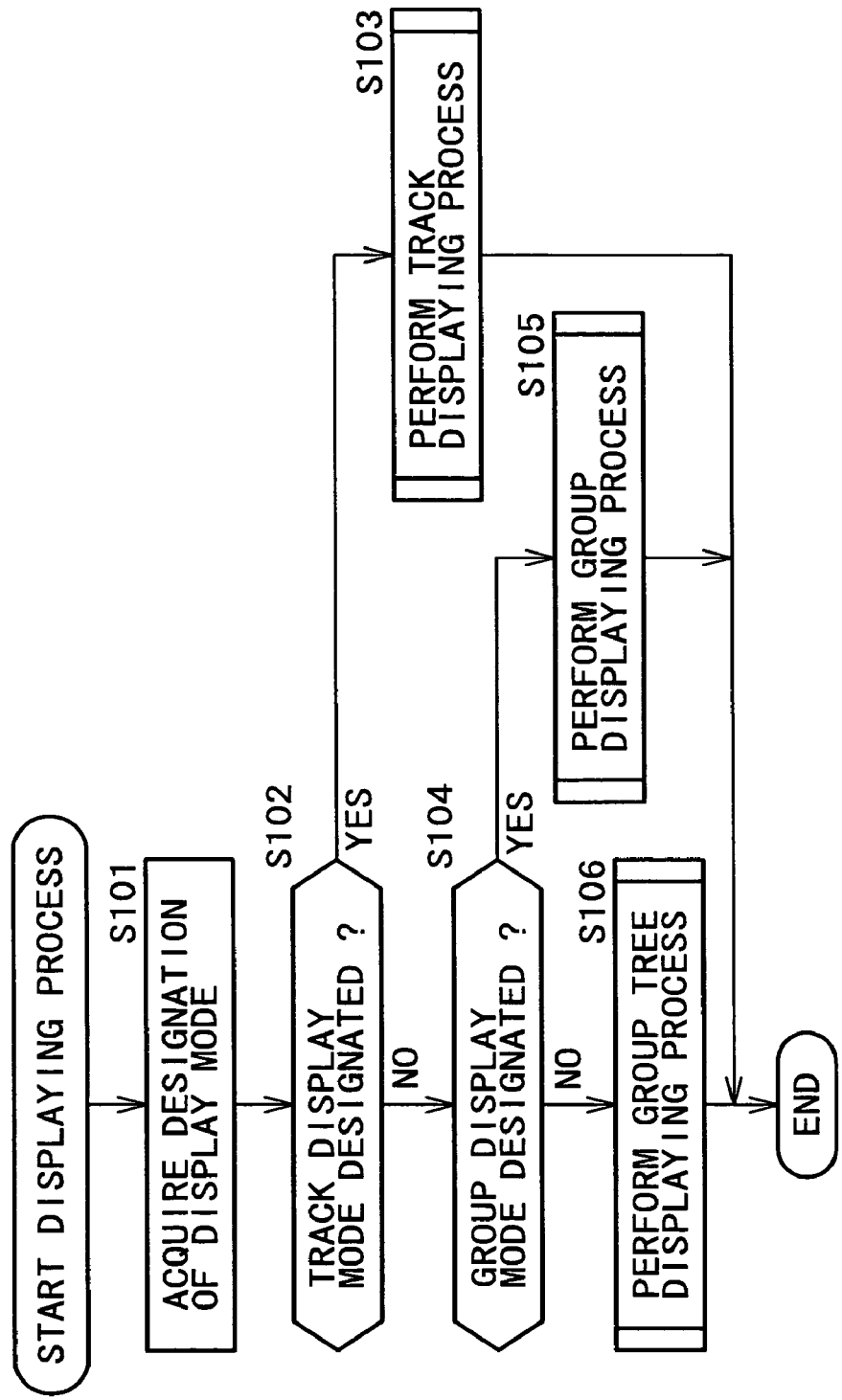

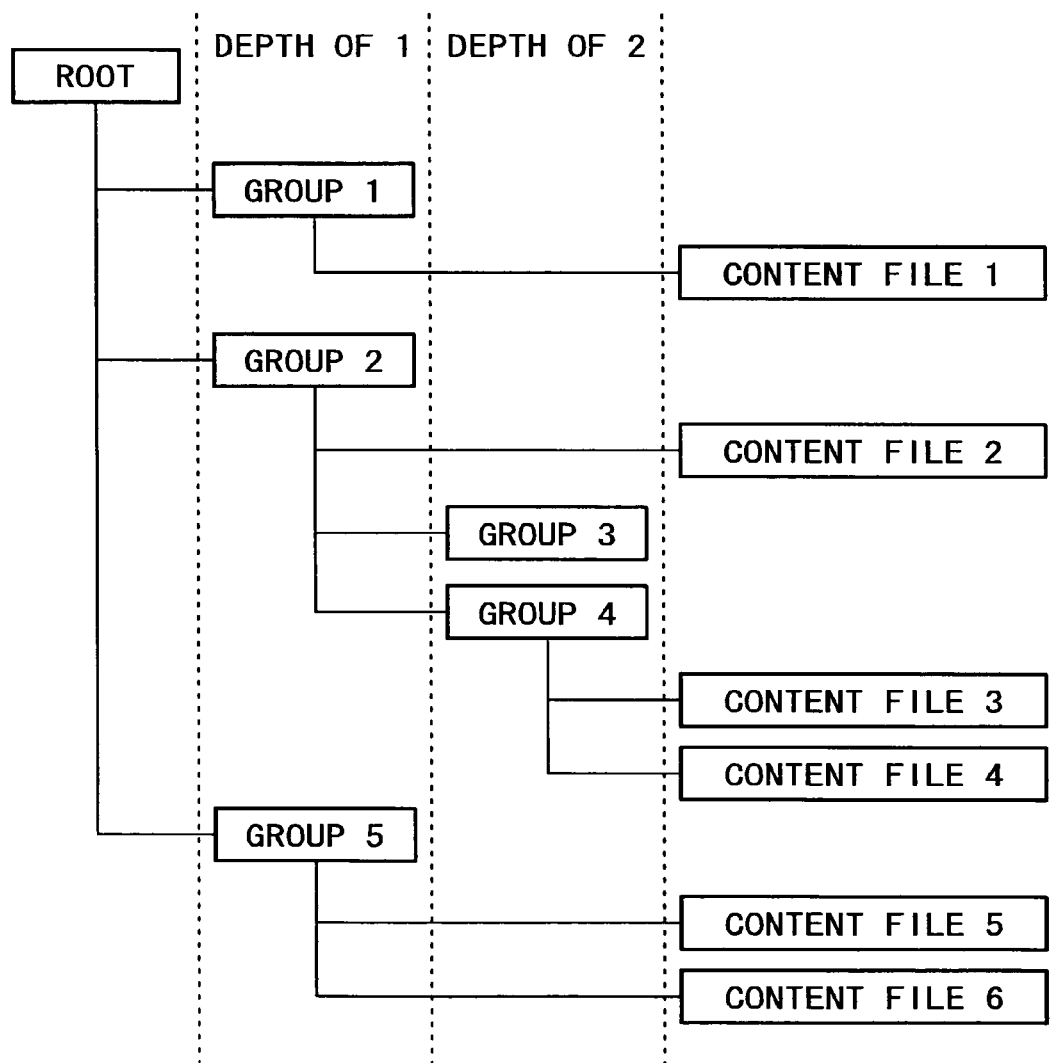
F I G. 1 8

INFORMATION PROCESSING APPARATUS, INFORMATION PROCESSING METHOD, RECORDING MEDIUM, PROGRAM, AND DATA

BACKGROUND OF THE INVENTION

The present invention relates to an information processing apparatus, an information processing method, a recording medium, a program, and data. More particularly, the invention relates to an information processing apparatus, an information processing method, a recording medium, a program, and data for displaying information about contents.

Diverse kinds of information processing apparatuses available today such as personal computers, PDAs (Personal Digital Assistants) and portable players are capable of reproducing different types of content including music, movies and TV broadcast programs.

These apparatuses manage contents in diverse manners, e.g., selecting and reproducing desired contents, rearranging content items into groups, moving contents from one apparatus to another, or editing content-related information such as performers' names and content titles. In handling content under its management, the information processing apparatus displays such content-related information on an internal or external display device connected to it. The user of the apparatus looks at the display and, based on what is being displayed, gives the apparatus various instructions such as reproduction or movement of contents.

Some apparatuses are arranged to record management information to a disk name area of the UTOC sector on a magneto-optical disk, the management information being constituted by program number range information "n1-n2" designating the numbers of programs making up groups corresponding to albums, by special codes "//" for delimiting group names representing a plurality of album names, and by the group names. The arrangement is designed to manage a plurality of programs recorded in a program area as a plurality of groups for editing purposes. One such apparatus is disclosed illustratively in Japanese Patent Laid-Open No. 2002-150749.

One problem with portable players is that their users find it more troublesome and time-consuming to search for a desired content item the larger the number of content items stored therein.

Illustratively, some portable players incorporate a mass storage medium such as a hard disk that requires their users to manipulate groups of content only in sequential fashion for reproduction. If there are more than 100 groups of content to deal with, the user has a hard time managing these groups or pieces of music efficiently.

That type of portable player generally has a limited ability to process editing work. It has been difficult for such players to handle groups of content in a tree structure that demands heavy burdens on the processing by the player.

Furthermore, the manner in which the information processing apparatus controls the display of information about the contents it handles is typically contingent on each specific type of the apparatus or the display device connected thereto. In other words, a given way of displaying content-related information cannot be shared by different information processing apparatuses or display devices with different capabilities for processing or display.

SUMMARY OF THE INVENTION

The present invention has been made in view of the above circumstances and provides an information processing apparatus, an information processing method, a recording medium, a program, and data for displaying information about content in a significantly improved manner.

In carrying out the invention and according to a first aspect thereof, there is provided an information processing apparatus for handling content items categorized in a predetermined number of groups, the information processing apparatus including: group number attaching means for attaching to the groups a series of group numbers made up of natural numbers starting from 1; and depth information attaching means for attaching depth information 1 to the group having the group number 1, wherein, if a given group with a group number N which is a natural number has depth information "a" which is also a natural number, then the depth information attaching means attaches the depth information formed by a natural number which is at least 1 and not more than a+1 to the group having the group number N+1.

Preferably, the information processing apparatus above may further include tree generating means for generating a tree of the groups; wherein, if the group having the depth information 1 is placed as a child under a root, if the group with the group number N has the depth information "a," and if the group with the group number N+1 has depth information "b" which is equal to a+1, then the tree generating means may place the group with the group number N+1 as a child under the group with the group number N; wherein, if the depth information "b" is equal to "a," then the tree generating means may place the group with the group number N+1 as a child under the group which is parent to the group with the group number N; and wherein, if the depth information "b" is less than "a," then the tree generating means may place the group with the group number N+1 as a child under the group which is an ancestor of the group with the group number N and which has depth information b-1.

Preferably, the information processing apparatus above may further include display controlling means for exerting control so as to display information related to the groups as well as to the content items on the basis of the generated tree.

According to a second aspect of the invention, there is provided an information processing method for use with an information processing apparatus for handling content items categorized in a predetermined number of groups, the information processing method including the steps of: attaching to the groups a series of group numbers made up of natural numbers starting from 1; and attaching depth information 1 to the group having the group number 1, wherein, if a given group with a group number N which is a natural number has depth information "a" which is also a natural number, then the depth information attaching step attaches the depth information formed by a natural number which is at least 1 and not more than a+1 to the group having the group number N+1.

According to a third aspect of the invention, there is provided a recording medium which records a program in a manner readable by a computer for information processing with a view to handling content items categorized in a predetermined number of groups, the program including the steps of: attaching to the groups a series of group numbers made up of natural numbers starting from 1; and attaching depth information 1 to the group having the group number 1, wherein, if a given group with a group number N which is a natural number has depth information "a" which is also a natural number, then the depth information attaching step attaches the depth information formed by a natural number which is at least 1 and not more than a+1 to the group having the group number N+1.

According to a fourth aspect of the invention, there is provided a program for causing a computer to perform information processing with a view to handling content items categorized in a predetermined number of groups, the program causing the computer to execute the steps including: attaching to the groups a series of group numbers made up of natural numbers starting from 1; and attaching depth information 1 to the group having the group number 1, wherein, if a given group with a group number N which is a natural number has depth information "a" which is also a natural number, then the depth information attaching step attaches the depth information formed by a natural number which is at least 1 and not more than a+1 to the group having the group number N+1.

According to a fifth aspect of the invention, there is provided a set of data for causing a computer to generate a tree of a predetermined number of groups categorizing content items, the data including: a series of group numbers made up of natural numbers starting from 1; and depth information which is 1 for the group with the group number 1 and which, if a given group with a group number N which is a natural number has depth information "a" which is also a natural number, then constitutes a natural number which is at least 1 and not more than a+1 representative of the depth of the group having the group number N+1 in the tree.

According to a sixth aspect of the invention, there is provided an information processing apparatus for handling content items categorized in groups forming a tree structure, the information processing apparatus including: acquiring means for acquiring designation of one of a first, a second, and a third display mode; and display controlling means which, if the first display mode is designated, then exerts control so as to display content-related information about the content items in a predetermined order of the content items; wherein, if the second display mode is designated, then the display controlling means displays group-related information about the groups in one layer while displaying the content-related information about the content items categorized in the groups in conjunction with the group-related information about the groups to which the content items belong; and wherein, if the third display mode is designated, then the display controlling means displays either the group-related information or the content-related information in a hierarchy based on the tree structure.

Preferably, the information processing apparatus above may further include tree structure generating means for generating the tree structure of the groups; wherein, if a series of group numbers made up of natural numbers starting from 1 are attached to the groups, if depth information 1 is attached to the group having the group number 1, and if a given group with a group number N which is a natural number has depth information "a" which is also a natural number, then the tree structure generating means may place the group with the depth information 1 as a child under a root on the ground that the depth information formed by a natural number which is at least 1 and not more than a+1 is attached to the group having the group number N+1; wherein, if the group with the group number N has the depth information "a" and if the group with the group number N+1 has depth information "b" which is equal to a+1, then the tree structure generating means may place the group with the group number N+1 as a child under the group with the group number N; wherein, if the depth information "b" is equal to "a," then the tree structure generating means may place the group with the group number N+1 as a child under the group which is parent to the group with the group number N; wherein, if the depth information "b" is less than "a," then the tree structure generating means may place the group with the group number N+1 as a child under the group which is an ancestor of the group with the group number N and which has depth information b-1; and wherein, if the third display mode is designated, then the display controlling means may display either the group-related information or the content-related information in a hierarchy based on the generated tree structure.

Preferably, the information processing apparatus above may further include: group number attaching means for attaching to the groups a series of group numbers made up of natural numbers starting from 1; and depth information attaching means for attaching depth information 1 to the group having the group number 1, wherein, if the group with the group number N which is a natural number has the depth information "a" which is also a natural number, then the depth information attaching means may attach the depth information formed by a natural number which is at least 1 and not more than a+1 to the group having the group number N+1.

According to a seventh aspect of the invention, there is provided an information processing method for use with an information processing apparatus for handling content items categorized in groups forming a tree structure, the information processing method including the steps of: acquiring designation of one of a first, a second, and a third display mode; and if the first display mode is designated, then exerting control so as to display content-related information about the content items in a predetermined order of the content items; wherein, if the second display mode is designated, then the display controlling step displays group-related information about the groups in one layer while displaying the content-related information about the content items categorized in the groups in conjunction with the group-related information about the groups to which the content items belong; and wherein, if the third display mode is designated, then the display controlling step displays either the group-related information or the content-related information in a hierarchy based on the tree structure.

According to an eighth aspect of the invention, there is provided a recording medium which records a program in a manner readable by a computer for information processing with view to handling content items categorized in groups forming a tree structure, the program including the steps of: acquiring designation of one of a first, a second, and a third display mode; and if the first display mode is designated, then exerting control so as to display content-related information about the content items in a predetermined order of the content items; wherein, if the second display mode is designated, then the display controlling step displays group-related information about the groups in one layer while displaying the content-related information about the content items categorized in the groups in conjunction with the group-related information about the groups to which the content items belong; and wherein, if the third display mode is designated, then the display controlling step displays either the group-related information or the content-related information in a hierarchy based on the tree structure.

According to a ninth aspect of the invention, there is provided a program for causing a computer to perform information processing with a view to handling content items categorized in groups forming a tree structure, the program causing the computer to execute the steps including: acquiring designation of one of a first, a second, and a third display mode; and if the first display mode is designated, then exerting control so as to display content-related information about the content items in a predetermined order of the content items; wherein, if the second display mode is designated, then the display controlling step displays group-related information about the groups in one layer while displaying the content-related information about the content items categorized in the groups in conjunction with the group-related information about the groups to which the content items belong; and wherein, if the third display mode is designated, then the display controlling step displays either the group-related information or the content-related information in a hierarchy based on the tree structure.

The information processing apparatus according to the invention may be an independent apparatus or a block that is capable of processing information.

Where the information processing apparatus, information processing method, recording medium, and program according to the invention are in use, a series of group numbers made up of natural numbers starting from 1 are attached to the groups of content items, and depth information 1 is attached to the group having the group number 1. If a given group with a group number N which is a natural number has depth information "a" which is also a natural number, then the depth information formed by a natural number which is at least 1 and not more than a+1 is attached to the group having the group number N+1.

Where the set of data according to the invention is in use, a tree of the groups may be generated, wherein, if a series of group numbers made up of natural numbers starting from 1 are attached to the groups, if depth information 1 is attached to the group having the group number 1, and if a given group with a group number N which is a natural number has depth information "a" which is also a natural number, then the group with the depth information 1 may be placed as a child under a root on the ground that the depth information formed by a natural number which is at least 1 and not more than a+1 is attached to the group having the group number N+1; wherein, if the group with the group number N has the depth information "a" and if the group with the group number N+1 has depth information "b" which is equal to a+1, then the group with the group number N+1 may be placed as a child under the group with the group number N; wherein, if the depth information "b" is equal to "a," then the group with the group number N+1 may be placed as a child under the group which is parent to the group with the group number N; and wherein, if the depth information "b" is less than "a," then the group with the group number N+1 may be placed as a child under the group which is an ancestor of the group with the group number N and which has depth information b-1.

As described, the inventive apparatus and method permit display of content-related information based on a tree structure by use of appreciably lower processing capabilities than before.

Furthermore, where the inventive information processing apparatus, information processing method, recording medium, and program are in use, the designation of one of a first, a second, and a third display mode is initially acquired. If the first display mode is found to be designated, then content-related information about the content items is displayed in a predetermined order of the content items. If the second display mode is designated, then group-related information about the groups is displayed in one layer along with the display of the content-related information about the content items categorized in the groups in conjunction with the group-related information about the groups to which the content items belong. If the third display mode is designated, then either the group-related information or the content-related information is displayed in a hierarchy based on the tree structure.

As described, the inventive apparatus, method and program allow different apparatuses with different levels of processing or display capabilities to display content-related information without having to modify their display devices or programs.

Other objects, features and advantages of the invention will become more apparent upon a reading of the following description and appended drawings.

BRIEF DESCRIPTION OF THE DRAWINGS

FIG. 5 is a tabular view depicting a typical content information file;

FIG. 6 is a tabular view showing a typical group information file;

FIG. 15 is another explanatory view presenting how groups are typically placed;

FIG. 17 is a flowchart of steps constituting a displaying process;

FIG. 18 is a schematic view showing a typical tree structure;

DETAILED DESCRIPTION OF THE PREFERRED EMBODIMENTS

Figure 1:
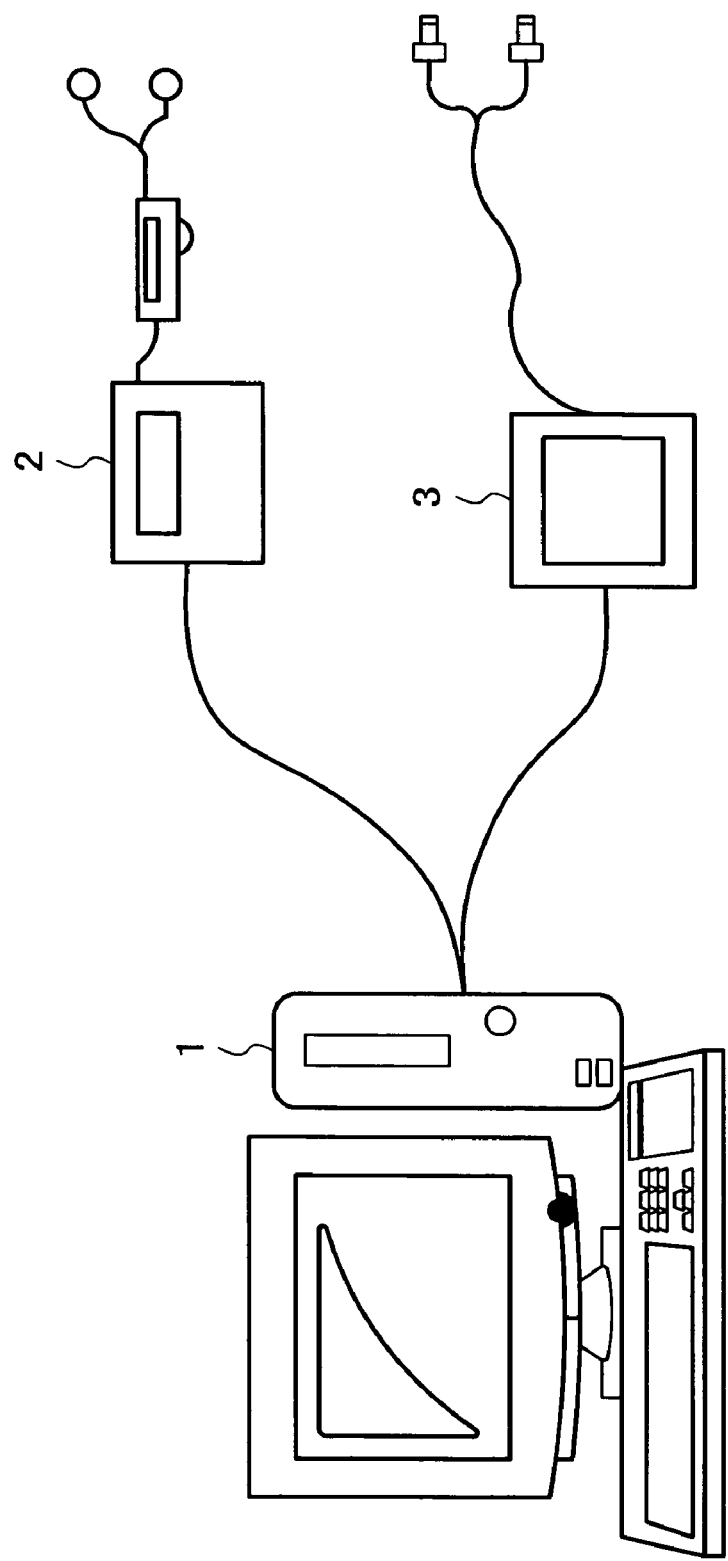
FIG. 1 is a schematic view showing a typical configuration of a content management system embodying the invention.

What is described below as the preferred embodiments of this invention corresponds to the appended claims as follows:

the description of the preferred embodiments basically confirms specific examples supporting what is claimed. If any example of the invention described below as a preferred embodiment does not have an exactly corresponding claim, this does not means that the example in question has no relevance to the claims. Conversely, if any example of the invention described hereunder has a specifically corresponding claim, this does not mean that the example in question has no relevance to any other claims.

Furthermore, the description below of the preferred embodiment does not claim to include all examples corresponding to the whole claims. In other words, the description hereunder does not limit or deny any inventive entities which are not covered by the appended claims of this invention but which may be added by this applicant in the future by divisional application, by amendment or otherwise.

According to this invention, there is provided an information processing apparatus including: group number attaching means (e.g., CPU 21 in FIG. 2 for carrying out step S11 in FIG. 8) for attaching to the groups a series of group numbers made up of natural numbers starting from 1 (e.g., group numbers shown in FIG. 6); and depth information attaching means (e.g., CPU 21 in FIG. 2 for carrying out steps S12 and S18 in FIG. 8) for attaching depth information 1 (e.g., depth corresponding to group number 1 in FIG. 6) to the group having the group number 1. If a given group with a group number N which is a natural number has depth information "a" which is also a natural number, then the depth information attaching means attaches the depth information formed by a natural number which is at least 1 and not more than a+1 (e.g., depth shown in FIG. 6) to the group having the group number N+1.

Preferably, the information processing apparatus above may further include tree generating means (e.g., CPU 21 in FIG. 2 for carrying out the steps of the flowchart in FIG. 9) for generating a tree of the groups. If the group having the depth information 1 (e.g., group N in FIG. 10) is placed as a child under a root, if the group with the group number N has the depth information "a," and if the group with the group number N+1 has depth information "b" which is equal to a+1, then the tree generating means may place the group with the group number N+1 (e.g., group N+1 in FIG. 11) as a child under the group with the group number N. If the depth information "b" is equal to "a," then the tree generating means may place the group with the group number N+1 (e.g., group N+1 in FIG. 12) as a child under the group (e.g., group M in FIG. 12) which is parent to the group with the group number N. If the depth information "b" is less than "a," then the tree generating means may place the group with the group number N+1 (e.g., group N+1 in FIG. 13) as a child under the group (e.g., group M in FIG. 13) which is an ancestor of the group with the group number N and which has depth information b-1.

Preferably, the information processing apparatus above may further include display controlling means (e.g., CPU 21 in FIG. 2 for carrying out the steps of the flowchart in FIG. 16) for exerting control so as to display information related to the groups as well as to the content items on the basis of the generated tree.

According to the invention, there is provided an information processing method including the steps of: attaching (e.g., in step S11 of FIG. 8) to the groups a series of group numbers made up of natural numbers starting from 1 (e.g., group numbers shown in FIG. 6); and attaching (e.g., in steps S12 and S18 of FIG. 8) depth information 1 (e.g., depth corresponding to group number 1 in FIG. 6) to the group having the group number 1. If a given group with a group number N which is a natural number has depth information "a" which is also a natural number, then the depth information attaching step attaches the depth information formed by a natural number which is at least 1 and not more than a+1 (e.g., depth shown in FIG. 6) to the group having the group number N+1.

According to the invention, there is provided a program (e.g., management information setting program 112 in FIG. 4) for causing a computer to execute the steps including: attaching (e.g., in step S11 of FIG. 8) to the groups a series of group numbers made up of natural numbers starting from 1 (e.g., group numbers shown in FIG. 6); and attaching (e.g., in steps S12 and S18 of FIG. 8) depth information 1 (e.g., depth corresponding to group number 1 in FIG. 6) to the group having the group number 1. If a given group with a group number N which is a natural number has depth information "a" which is also a natural number, then the depth information attaching step attaches the depth information formed by a natural number which is at least 1 and not more than a+1 (e.g., depth shown in FIG. 6) to the group having the group number N+1.

Figure 2:
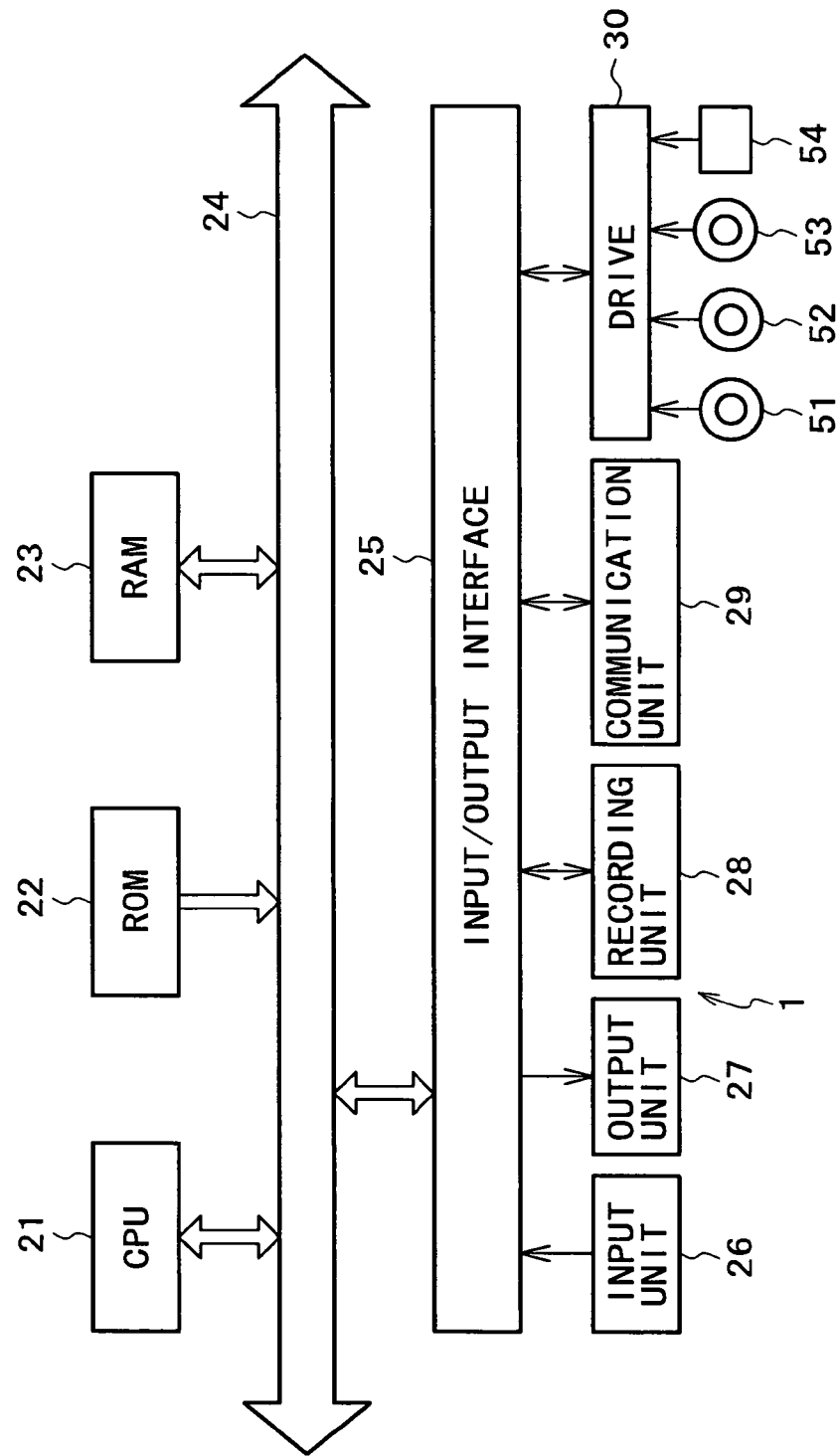
FIG. 2 is a block diagram depicting a typical structure of a personal computer.

The program above may be recorded on a recording medium (e.g., magnetic disk 51 in FIG. 2).

According to the invention, there is provided a set of data (e.g., group information file 115-1 in FIG. 4) for causing a computer to generate a tree of groups, the data including: a series of group numbers made up of natural numbers starting from 1 (e.g., group numbers shown in FIG. 6); and depth information which is 1 for the group with the group number 1 and which, if a given group with a group number N which is a natural number has depth information "a" which is also a natural number, then constitutes a natural number which is at least 1 and not more than a+1 (e.g., depth in FIG. 6) representative of the depth of the group having the group number N+1 in the tree.

According to the invention, there is also provided an information processing apparatus including: acquiring means (e.g., input unit 26 in FIG. 4) for acquiring designation of one of a first, a second, and a third display mode; and display controlling means (e.g., CPU 21 in FIG. 2 for executing a display control program 111 in FIG. 4) which, if the first display mode (e.g., track display mode in FIG. 17) is designated, then exerts control so as to display content-related information (e.g., content names in FIG. 5) about the content items in a predetermined order of the content items (e.g., in order of content file numbers in FIG. 5); wherein, if the second display mode (e.g., group display mode in FIG. 17) is designated, then the display controlling means displays group-related information (e.g., group names in FIG. 6) about the groups in one layer while displaying the content-related information about the content items categorized in the groups in conjunction with the group-related information about the groups to which the content items belong; and wherein, if the third display mode (e.g., group tree display mode in FIG. 17) is designated, then the display controlling means displays either the group-related information or the content-related information in a hierarchy based on the tree structure.

Preferably, the information processing apparatus above may further include tree structure generating means (e.g., CPU 21 in FIG. 2 for carrying out the steps of the flowchart in FIG. 9) for generating the tree structure of the groups; wherein, if a series of group numbers made up of natural numbers starting from 1 (e.g., group numbers in FIG. 6) are attached to the groups, if depth information 1 (e.g., depth corresponding to group number 1 in FIG. 6) is attached to the group having the group number 1, and if a given group with a group number N which is a natural number has depth information "a" which is also a natural number, then the tree structure generating means may place the group with the depth information 1 (e.g., group N in FIG. 10) as a child under a root on the ground that the depth information formed by a natural number which is at least 1 and not more than a+1 (e.g., depth in FIG. 6) is attached to the group having the group number N+1; wherein, if the group with the group number N has the depth information "a" and if the group with the group number N+1 has depth information "b" which is equal to a+1, then the tree structure generating means may place the group with the group number N+1 (e.g., group N+1 in FIG. 11) as a child under the group with the group number N; wherein, if the depth information "b" is equal to "a," then the tree structure generating means may place the group with the group number N+1 (e.g., group N+1 in FIG. 12) as a child under the group (e.g., group M in FIG. 12) which is parent to the group with the group number N; wherein, if the depth information "b" is less than "a," then the tree structure generating means may place the group with the group number N+1 (e.g., group N+1 in FIG. 13) as a child under the group (e.g., group M in FIG. 13) which is an ancestor of the group with the group number N and which has depth information b-1; and wherein, if the third display mode is designated, then the display controlling means may display either the group-related information or the content-related information in a hierarchy based on the generated tree structure.

Preferably, the information processing apparatus above may further include: group number attaching means (e.g., CPU 21 in FIG. 2 for carrying out step S11 in FIG. 8) for attaching to the groups a series of group numbers made up of natural numbers starting from 1; and depth information attaching means (e.g., CPU 21 in FIG. 2 for carrying out steps S12 and S18 in FIG. 8) for attaching depth information 1 to the group having the group number 1, wherein, if the group with the group number N which is a natural number has the depth information "a" which is also a natural number, then the depth information attaching means may attach the depth information formed by a natural number which is at least 1 and not more than a+1 to the group having the group number N+1.

According to the invention, there is also provided an information processing method including the steps of: acquiring (e.g., in step S101 of FIG. 17) designation of one of a first, a second, and a third display mode; and if the first display mode (e.g., track display mode in FIG. 17) is designated, then exerting control so as to display (e.g., in step S103 of FIG. 17) content-related information (e.g., content names in FIG. 5) about the content items in a predetermined order of the content items (e.g., in order of content file numbers in FIG. 5); wherein, if the second display mode (e.g., group display mode in FIG. 17) is designated, then the display controlling step displays (e.g., in step S105 of FIG. 17) group-related information (e.g., group names in FIG. 6) about the groups in one layer while displaying the content-related information about the content items categorized in the groups in conjunction with the group-related information about the groups to which the content items belong; and wherein, if the third display mode (e.g., group tree display mode in FIG. 17) is designated, then the display controlling step displays (e.g., in step S106 of FIG. 17) either the group-related information or the content-related information in a hierarchy based on the tree structure.

According to the invention, there is also provided a program (e.g., file management program in FIG. 4) for causing a computer to execute the steps including: acquiring (e.g., in step S101 of FIG. 17) designation of one of a first, a second, and a third display mode; and if the first display mode (e.g., track display mode in FIG. 17) is designated, then exerting control so as to display (e.g., in step S103 of FIG. 17) content-related information (e.g., content names in FIG. 5) about the content items in a predetermined order of the content items (e.g., in order of content file numbers in FIG. 5); wherein, if the second display mode (e.g., group display mode in FIG. 17) is designated, then the display controlling step displays (e.g., in step S105 of FIG. 17) group-related information (e.g., group names in FIG. 6) about the groups in one layer while displaying the content-related information about the content items categorized in the groups in conjunction with the group-related information about the groups to which the content items belong; and wherein, if the third display mode (e.g., group tree display mode in FIG. 17) is designated, then the display controlling step displays (e.g., in step S106 of FIG. 17) either the group-related information or the content-related information in a hierarchy based on the tree structure.

The program above may be recorded on a recording medium (e.g., magnetic disk 51 in FIG. 2).

FIG. 1 schematically shows a typical configuration of a content management system embodying the invention. This content management system is made up of information processing apparatuses such as a personal computer 1 and portable players 2 and 3.

The personal computer 1 records contents and causes a display device to display information related to the recorded contents. Illustratively, the personal computer 1 causes the display device to display such content-related information in list or tree structure form.

The word "contents" refers to any kinds of information useful to users. For example, contents may be audio data, image data such as still pictures or moving pictures, numeric data, or programs. The expression "content-related information" refers to any information associated with the content of interest in any way. Illustratively, content-related information may be content names or titles, names of those who produced the content, names of those who provide the content, content lengths (e.g., reproducing times), names of performers appearing in the content, and name of the author.

The personal computer 1 "checks out" the content recorded therein to the portable player 2 or 3, or "checks in" content from the portable player 2 or 3. The personal computer 1 also moves or copies the recorded content from inside to the portable player 2 or 3.

When contents is checked out, moved or copied from the personal computer 1 to the portable player 2 or 3, data which is necessary for displaying content-related information and which is recorded in the personal computer 1 are copied from the personal computer 1 to the portable player 2 or 3. Such data needed to display the content-related information will be discussed later in detail.

The portable player 2 stores contents and causes a display device mounted on the player body or on a remote controller to display information related to the stored content. For example, the portable player 2 causes the display device to display the information related to the stored content in list form.

The portable player 2 reproduces the stored contents inside. More specifically, the portable player 2 first accommodates content that has been checked out, moved, or copied from the personal computer 1 to the player. The portable player 2 may then reproduce the content thus stored, illustratively giving audio output of audio data if they constitute the content.

The portable player 3 stores contents and causes the display device to display information related to the content thus stored inside. For example, the portable player 3 causes the display device to display such content-related information in list or tree structure form.

The portable player 3 reproduces the content stored inside. More specifically, the portable player 3 first accommodates content that has been checked out, moved, or copied from the personal computer 1 to the player. The portable player 3 may then reproduce the stored content, illustratively giving audio output of audio data if they constitute the content. If the stored content is composed of video data, the portable player 3 outputs pictures by reproducing the video data making up the content.

The personal computer 1 and portable players 2 and 3 cause their display devices to display content-related information by resorting to processes common to the three apparatuses.

The personal computer 1 is structured illustratively as shown in FIG. 2. A CPU (Central Processing Unit) 21 performs various processes in accordance with programs held in a ROM (Read Only Memory) 22 or a recording unit 28. A RAM (Random Access Memory) 23 accommodates programs and data that may be needed by the CPU 21 in carrying out its processing. The CPU 21, ROM 22, and RAM 23 are interconnected by way of a bus 24.

The CPU 21 is also connected with an input/output interface 25 through the bus 24. The input/output interface 25 is connected with an input unit 26 made up of a keyboard, a mouse and a microphone and with an output unit 27 formed by a display device and speakers. The CPU 21 executes diverse processes in response to instructions entered through the input unit 26. Pictures and sounds acquired by the CPU 21 performing its operation are forwarded to the output unit 27.

The recording unit 28 connected to the input/output interface 25 is illustratively composed of a hard disk drive that records programs run by the CPU 21 as well as various data (including contents). A communication unit 29 communicates with an external device such as the portable player 2 or 3 over the Internet or some other network or through appropriate communication media.

Programs may be acquired from the outside through the communication unit 29 and recorded to the recording unit 28.

A drive 30 connected to the input/output interface 25 accommodates a magnetic disk 51, an optical disk 52, a magneto-optical disk 53, or a semiconductor memory 54. When any one of these recording media is loaded into the drive 30, the drive 30 acquires programs and data from the loaded medium. The programs and programs thus obtained are transferred as needed to the recording unit 28 for storage therein.

Figure 3:
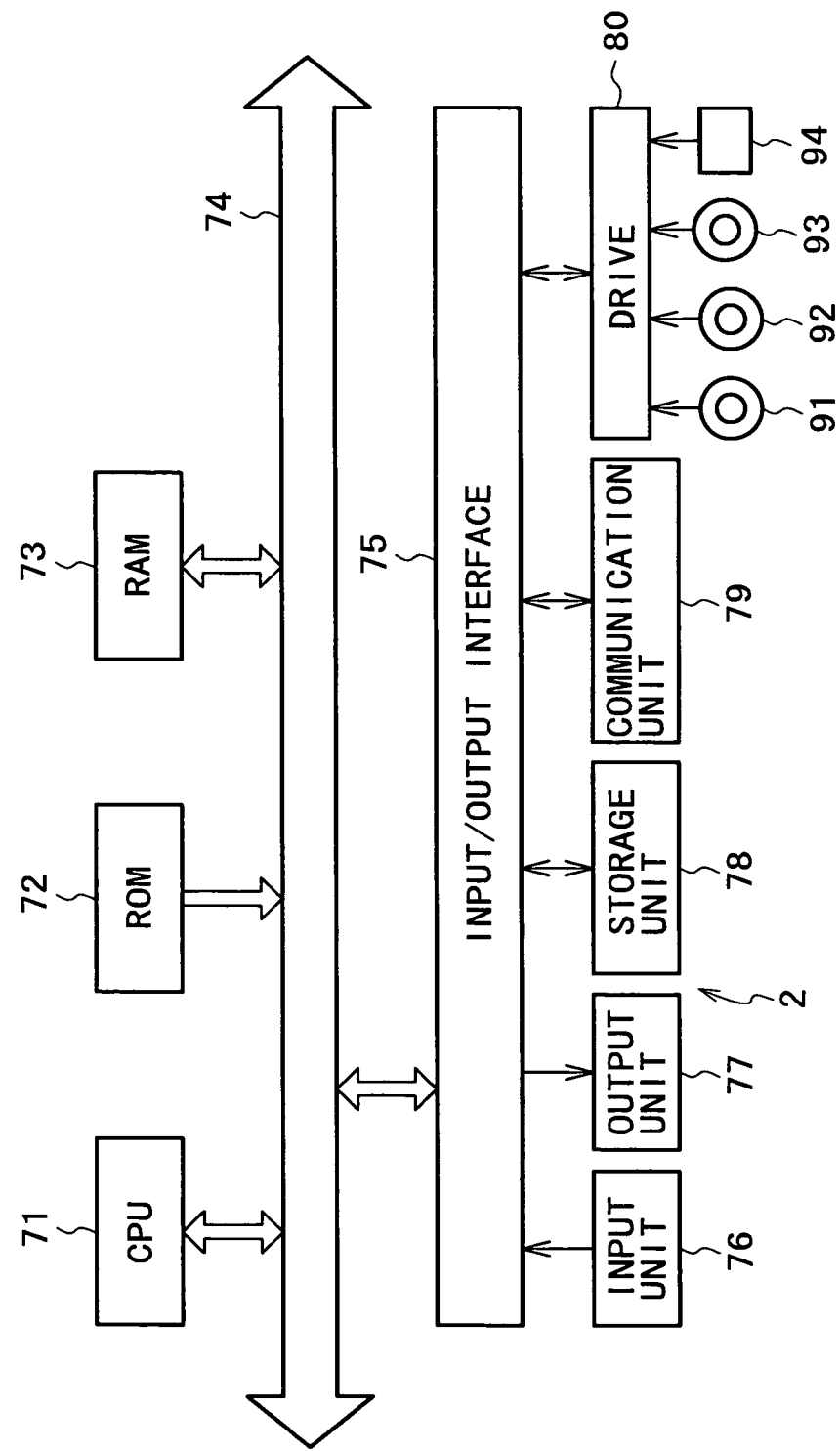
FIG. 3 is a block diagram illustrating a typical structure of a portable player.

The portable player 2 is structured illustratively as shown in FIG. 3. A CPU 71 carries out diverse processes in keeping with programs held in a ROM 72 or in a storage unit 78. A RAM 73 stores programs and data that may be needed by the CPU 71 in performing its processing. The CPU 71, ROM 72, and RAM 73 are interconnected by way of a bus 74.

The CPU 71 is also connected with an input/output interface 75 through the bus 74. The input/output interface 75 is connected with an input unit 76 made up of a remote controller, switches and a microphone and with an output unit 77 formed by a display device and earphones. The CPU 71 executes diverse processes in response to instructions entered through the input unit 76. Pictures and sounds acquired by the CPU 71 executing its operation are forwarded to the output unit 77.

The storage unit 78 connected to the input/output interface 75 is illustratively composed of a semiconductor memory such as a flash memory that records programs to be run by the CPU 71 as well as various data (including content) for use thereby. A communication unit 79 communicates with an external device such as the personal computer 1 over the Internet or some other network or through appropriate communication media.

Programs may be acquired from the outside through the communication unit 79 and recorded to the storage unit 78.

A drive 80 connected to the input/output interface 75 accommodates a magnetic disk 91, an optical disk 92, a magneto-optical disk 93, or a semiconductor memory 94. When any one of these recording media is loaded into the drive 80, the drive 80 acquires programs and data from the loaded medium. The programs and programs thus obtained are transferred as needed to the storage unit 78 for storage therein.

The portable player 3 has the same structure as the portable player 2 and thus will not be described further.

The personal computer 1 and the portable players 2 and 3 cause their display devices to display content-related information by resorting to functions and processes common to the three apparatuses. What follows is a description of how the personal computer 1, typical of the inventive apparatus, functions and performs its processing in order to display the content-related information.

That is, the functions possessed by the personal computer 1 for display purposes are also retained by the portable players 2 and 3. The processes executed by the personal computer 1 for display are also carried out by the portable players 2 and 3.

Figure 4:
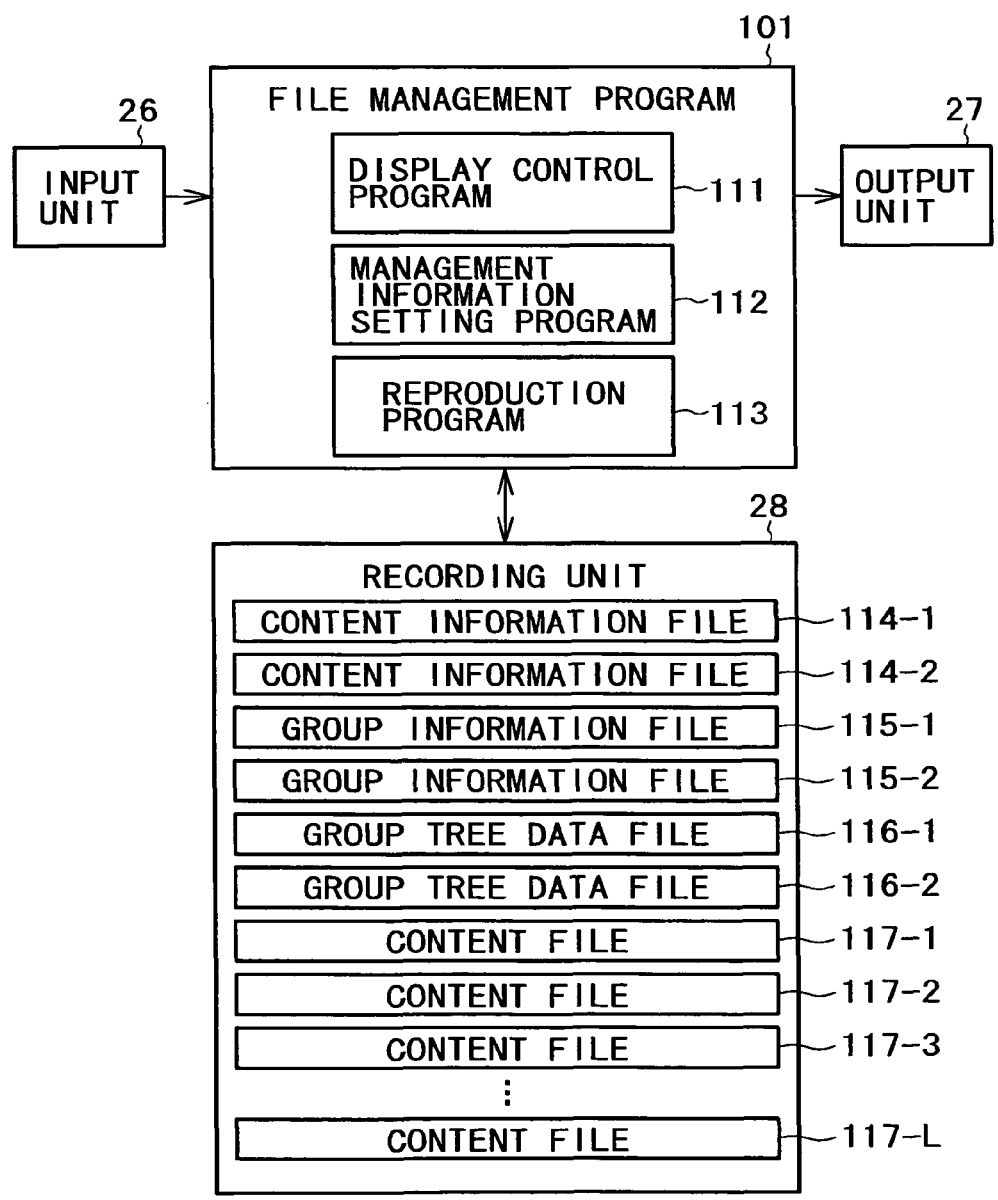
FIG. 4 is a block diagram indicating functions of the personal computer.

FIG. 4 is a block diagram outlining the functions of the personal computer 1. The CPU 21 in the personal computer 1 carries out a file management program 101. This is a program that causes the CPU 21 to execute diverse processes for managing files that accommodate contents.

For example, the file management program 101 may be run by the personal computer 1 to manage stored music content, to select content items, and to reproduce the selected music content. In another example, the file management program 101 may be run by the personal computer 1 to manage stored moving picture content, to select moving picture content items, and to reproduce the selected moving picture content.

The file management program 101 includes a display control program 111, a management information setting program 112, and a reproduction program 113.

The display control program 111 is a program that controls display of content-related information. The management information setting program 112 establishes information necessary for managing content items. The reproduction program 113 is used to reproduce contents.

The recording unit 28 in the personal computer 1 records contents, information related to the contents, and data needed to display the content-related information.

More specifically, the recording unit 28 accommodates files ranging from a content information file 114-1 to a content file 117-L as illustrated.

The content information files 114-1 and 114-2 each accommodate information related to the stored contents, as well as data necessary for displaying the content-related information.

Group information files 115-1 and 115-2 as well as group tree data files 116-1 and 116-2 store data which are needed to display the content-related information.

The group information files 115-1 and 115-2 accommodate information related to groups that categorize content items. A group signifies a set of content items (or content files).

Illustratively, groups can each be denoted by the positions in which to delimit the content files arranged in the order in which the files are to be reproduced. Alternatively, groups can each be denoted by the content item(s) (or content file(s)) belonging to the group in question.

The group tree data files 116-1 and 116-2 each accommodate data representative of a tree structure (i.e., group tree data) of groups that categorize the content items involved.

The group tree is utilized in managing content items or groups. The expression "managing" refers to operations of editing work such as displaying, setting, or modification of content-related information such as content names, or group-related information such as group names, as well as movement of content items.

The personal computer 1 can manage groups of content in a hierarchical (i.e., layer) structure by making use of the data which are held in the group tree data file 116-1 or 116-2 and which indicate the tree structure of the groups.

The content files 117-1 through 117-L hold content each.

Illustratively, the management information setting program 112 stores various kinds of data into the files ranging from the content information file 114-1 to the group information file 115-2. This establishes the data necessary for displaying content-related information.

For example, the display control program 111 generates data indicative of a tree structure of groups that categorize content items on the basis of the information held in the files ranging from the content information file 114-1 to the group information file 115-2. The generated data are placed into the group tree data file 116-1 or 116-2. The display control program 111 controls display of content-related information in accordance with the information held in the files ranging from the content information file 114-1 to the group information file 115-2 as well as with the data stored in the group tree data file 116-1 or 116-2.

As described, there are provided two content information files 114-1 and 114-2, two group information files 115-1 and 115-2, and two group tree data files 116-1 and 116-2. The dual file arrangement is designed to manage individually the-content files 117-1 through 117-L through the use of two sets of files: one made up of the content information file 114-1, group information file 115-1, and group tree data file 116-1; the other set composed of the content information file 114-2, group information file 115-2, and group tree data file 116-2.

More specifically, the management information setting program 112 writes illustratively to the content information file 114-1 and group information file 115-1 diverse items of first information necessary for content management. The management information setting program 112 then writes illustratively to the content information file 114-2 and group information file 115-2 various items of second information which differs from the first information and which is also needed for content management.

Illustratively, the display control program 111 generates data indicative of a tree structure of groups that categorize content items on the basis of the content-related information held in the content information file 114-1 and group information file 115-1. The data thus generated are placed into the group tree data file 116-1. The display control program 111 then controls display of the content-related information in accordance with the information held in the content information file 114-1 and group information file 115-1 as well as with the data stored in the group tree data file 116-1.

As another example, the display control program 111 generates data indicative of a tree structure of groups that categorize content items on the basis of the content-related information held in the content information file 114-2 and group information file 115-2. The data thus generated are stored into the group tree data file 116-2.

The content information file 114-2 and group information file 115-2 retain the information that is different from the information held in the content information file 114-1 and group information file 115-1. Thus the display control program 111 generates data which indicate the group tree structure and which differ from the data held in the group tree data file 116-1, and places the generated data into the group tree data file 116-2.

The display control program 111 then controls display of the content-related information in accordance with the information held in the content information file 114-2 and group information file 115-2 as well as with the data stored in the group tree data file 116-2. In this case, the display control program 111 can display the content-related information in a manner different from the case where the information held in the content information file 114-1 and group information file 115-1 and the data stored in the group tree data file 116-1 are utilized.

As described, the file management program 101 retains a plurality of kinds of content-related information in the same format regarding a single set of content items (e.g., content files 117-1 through 117-L). This makes it possible to display content-related information about a single set of content items in a plurality of manners. Furthermore, the file management program 101 holds a plurality of data necessary for content display in the same format regarding a single set of content items (e.g., content files 117-1 through 117-L). This also permits display of content-related information regarding a single set of content items in a plurality of manners.

For example, if the information about all content files 117-1 through 117-L is stored into the content information file 114-1, group information file 115-1, and group tree data file 116-1, then the file management program 101 can display content-related information about all the content files 117-1 through 117-L on the basis of the files 114-1, 115-1 and 116-1. Given such display, the user may move, delete, copy or otherwise manipulate the content items in any of the content files 117-1 through 117-L.

If file-related information about desired content items in the content files 117-1 through 117-L is stored into the content information file 114-2, group information file 115-2, and group tree data file 116-2, then the file management program 101 can display the file-related information only about the desired content on the basis of the content information file 114-2, group information file 115-2, and group tree data file 116-2. The user is able to perform operations such as getting a desired content item reproduced more quickly than before based on the display.

As described, two sets of information may be recorded depending on the manner in which content items are to be handled. One set of information may be placed into the content information file 114-1, group information file 115-1 and group tree data file 116-1; and the other set may be retained in the content information file 114-2, group information file 115-2 and group tree data file 116-2.

The number of content information files is not limited to two (i.e., files 114-1 and 114-2); there may be either one content information file, or three or more content information files as needed. Likewise, there may be provided either one group information file, or three or more content information files instead of the two files 115-1 and 115-2; there may also be either one group tree data file, or three or more group tree data files instead of the two files 116-1 and 116-2.

If there is no need to distinguish between the content information files 114-1 and 114-2, between the group information files 115-1 and 115-2, and between the group tree data files 116-1 and 116-2 in the description that follows, these files will be simply referred to as the content information file 114, group information file 115, and group tree data file 116 respectively.

FIG. 5 is a tabular view showing an example of the content information file 114. This file has content file numbers listed in association with corresponding content file names and content names.

The content file numbers indicate the order in which the content files (or content items) are to be reproduced. Each content file number is a positive integer of at least 1 (i.e., natural number). These numbers are established in ascending order with regard to the names of the corresponding content files. The content file numbers are part of the data necessary for displaying content-related information.

For example, the content file numbers are furnished in such a manner that one content file number corresponds to one content file name. In this case, the content file names are assigned uniquely to all content files.

As another example, the content file numbers may be furnished in such a manner that one content file number corresponds to a plurality of content file numbers.

Each of the content file names in the content information file 114 indicates one of the file names representative of the content files 117-1 through 117-L. As such, each content file name identifies one of the content files 117-1 through 117-L.

The content names in the content information file 114 are part of typical content-related information. Each content name identifies the content held in one of the content files 117-1 through 117-L and is used to display the nature of the content in question.

Illustratively, if the file name of a content file 117-i is "undoukai.jpg" and if the file 117-i contains pictures of an athletic meet, then one of the content file names placed in the content information file 114 is "undoukai.jpg" which corresponds to the content name "undoukai" ("athletic meet" in Japanese).

For example, if content is made up of audio data (piece of music or song), then the name of that content may be a title of the music or may simply be a track number corresponding to the music.

In the example of the content information file 114 in FIG. 5, the content file number 1 is associated with a content file name "aaa" and a content name "AAAA." The content file number 2 is associated with a content file name "bbb" and a content name "BBBB." In this case, the name of the content file 117-1 is "aaa"; the name of the content file 117-2 is "bbb."

Also in the example of the content information file 114 in FIG. 5, the content file number 3 is associated with a content file name "ccc" and a content name "CCCC"; the content file number 4 is associated with a content file name "ddd" and a content name "DDDD." In this case, the name of the content file 117-3 is "ccc"; the name of the content file 117-4 is "ddd."

Because each content file number is associated with a content file name and a content name as described, each of the content files 117-1 through 117-L can be identified with a content file number and a content name. That is, if a content file number is designated, the file management program 101 reads one of the content files 117-1 through 117-L which corresponds to the designated content file number so that the retrieved file may be reproduced.

FIG. 6 is a tabular view showing an example of the group information file 115. This file has group numbers listed in association with corresponding ranges of content file numbers, group names, and group depths, i.e., depth information about each group.

The group numbers indicate the order in which the groups are to be reproduced. In other words, the group numbers indicate in units of groups the order in which content items belonging to the groups are to be reproduced.

Each group number is a positive integer of at least 1 (i.e., natural number). These numbers are established in ascending order with regard to the corresponding ranges of content file numbers. Illustratively, the group numbers are assigned uniquely to all groups.

One range of content file numbers indicates the numbers of content files belonging to a single group. That is, one content file number range indicates the content items that belong to one group.

Each range of content file numbers accommodates content file numbers made up of natural numbers in ascending order. In other words, the group numbers are established in ascending order of the content file numbers.

It is possible to identify any one of the content files 117-1 through 117-L which belongs to the group identified by a given group number, by resorting to the range of the content file numbers corresponding to that group number in the group information file 115, and by use of the content information file 114.

For example, the ranges of content file numbers are established with regard to the group numbers in such a manner that each content file number corresponds to a single group number. Alternatively, the ranges of content file numbers are established with respect to the group numbers in such a manner that each content file number corresponds to a plurality of group numbers.

Each group name in the group information file 115 indicates the name of a corresponding group and is used to identify the group of interest. For example, if a content item is composed of a piece of music (e.g., song), the group name may take on an artist's name or an album name and the content name may be the title of that song.

As another example, if a content item is made up of moving pictures of a broadcast program, then the group name may be the broadcast station's name, a performer's name, a scenario writer's name or an author's name, and the content name may be a broadcast program name or a program title.

The depths in the group information file 115 constitute typical depth information. When groups are arranged into a tree (structure), each component group has a depth denoting a distance relative to the root of the tree. That is, the depths in the group information file 115 indicate a typical depth of each group as a node in the tree.

In other words, the depth of each of the groups making up a hierarchical (i.e., layer) structure of the group tree represents the depth of the layer to which the group in question belongs. The layer immediately below the root is 1. The depth is incremented by 1 every time the next deeper layer is reached. The root in this context is the root of an oriented tree in the graph theory.

In the example of the group information file 115 in FIG. 6, the group number 1 is associated with a content file number range of 1, a group name of "α," and a depth of 1; the group number 2 is associated with a content file number range of 2, a group name of "β", and the depth of 1.

Also in the example of the group information file 115 in FIG. 6, the group number 3 is associated with a null range of content file numbers (symbol "-" indicates a null), a group name of "γ," and a depth of 2.

Furthermore, in the example of the group information file 115 in FIG. 6, the group number 4 is associated with a content file number range of 3 to 4, a group name of "δ," and the depth of 2; the group number 5 is associated with a content file number range of 5 to 6, a group name of "ε," and the depth of 1.

For example, if the content of interest is composed of music, the name of the group with the group information 1 may be an artist's name and the name of the group with the depth information 2 may be an album title. In this case, the file management program 101 displays the artist's name in the layer 1 and the album title in the layer 2. The artist's name and album title on display allow the user easily to search for the desired music and to have it reproduced.

As another example, if the content of interest is composed of moving pictures of a broadcast program, the name of the group with the depth information 1 may be a broadcast station name and the name of the group with the depth information 2 may be the genre of the program in question. In this example, the file management program 101 displays the broadcast station name in the layer 1 and the program genre in the layer 2. The broadcast station name and the genre on display allow the user easily to search for the moving pictures of the desired content and to have it reproduced.

Figure 7:
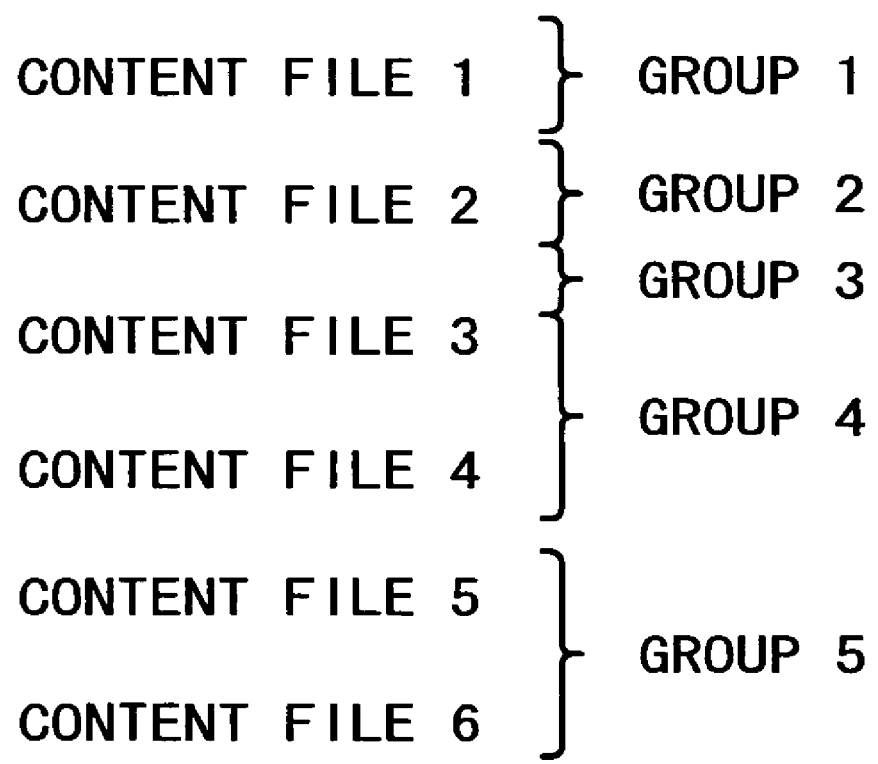
FIG. 7 is a schematic view showing how group numbers typically correspond to ranges of content file numbers.

FIG. 7 schematically shows how group numbers typically correspond to ranges of content file numbers in the case of the group information file 115 in FIG. 6. In FIG. 7, the name of the content file 117 with the content file number 1 is indicated as "content file 1." Likewise, the names of the content files 117 with the content file numbers 2 through 6 are indicated as "content files 2" through "content files 6" respectively.

Also in FIG. 7, the name of the group with the group number 1 is given as "group 1." Similarly, the names of the groups with the group numbers 2 through 5 are given as "group 2" through "group 5" respectively.

As indicated, the content file 117 named "content file 1" belongs to the group with the group number 1. The content file 117 named "content file 2" belongs to the group with the group number 2. None of the content files 117 belongs to the group with the group number 3; the group numbered 3 is empty.

The content file 117 named "content file 3" and the content file 117 named "content file 4" belong to the group with the group number 4. The content file 117 named "content file 5" and the content file 117 named "content file 6" belong to the group with the group number 5.

In the portable players 2 and 3, the files ranging from the content information file 114 to the content file 117 are stored in the storage unit 78.

Figure 8:
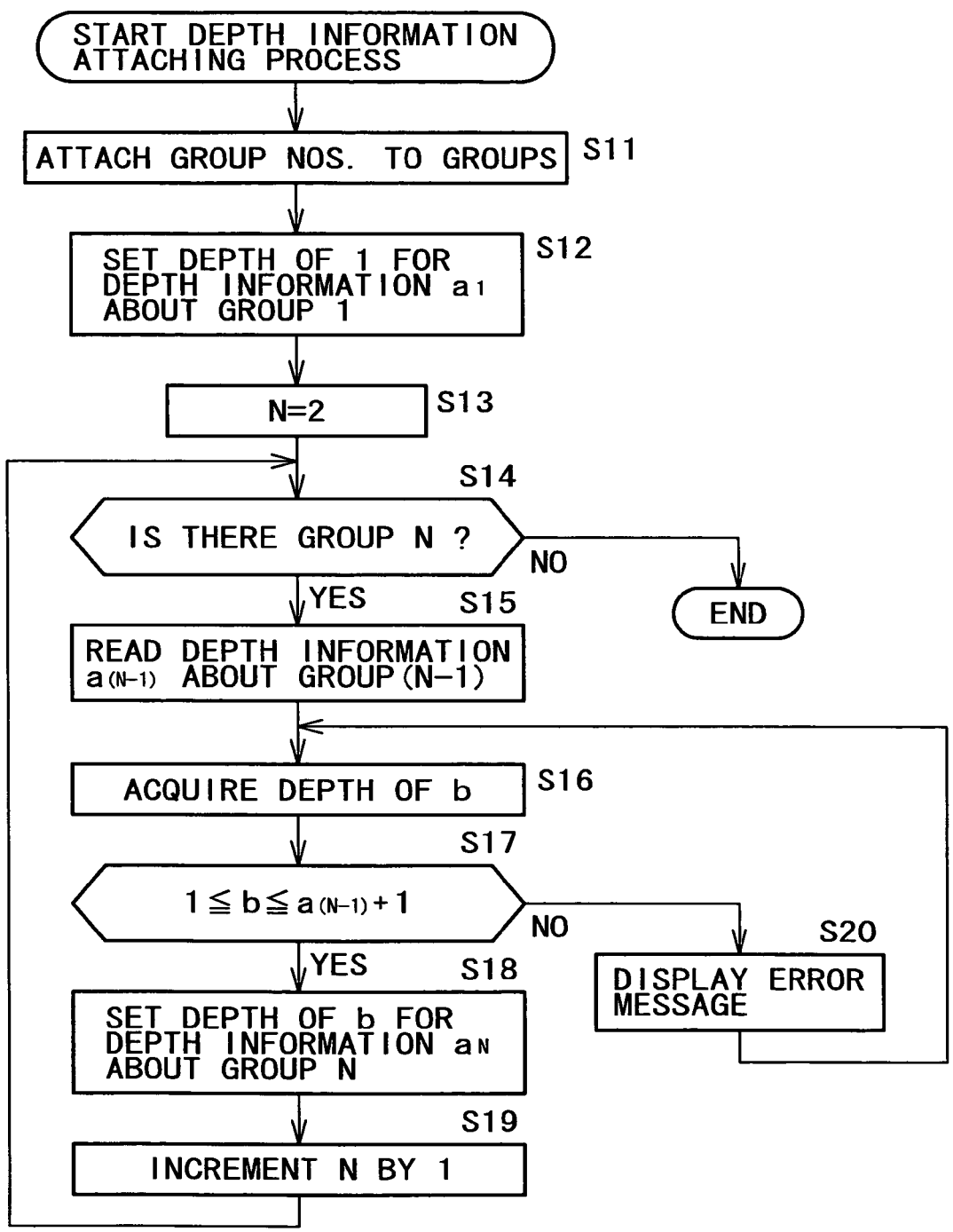
FIG. 8 is a flowchart of steps constituting a depth information attaching process.

FIG. 8 is a flowchart of steps constituting a depth information attaching process to be performed by the personal computer 1 running the file management program 101. In step S11, the management information setting program 112 in the file management program 101 attaches group numbers to groups of content. That is, the management information setting program 112 attaches to the groups involved a series of group numbers made up of natural numbers starting from 1.

More specifically, the ranges of content file numbers in the group information file 115 in FIG. 6 represent content items that belong to one group. Because the content file numbers are established in ascending order, the management information setting program 112 places into the group information file 115 a series of group numbers composed of natural numbers starting from 1 in association with the ranges of content file numbers. Thus the order of the group numbers corresponds to the order of the content file numbers.

In step S12, the management information setting program 112 sets a depth of 1 for depth information a1 about the group with the group number 1. In the description that follows, the group with the group number "n" is presented as "group n." Depth information "a" about the group n is called depth information aN.

Illustratively, the management information setting program 112 in step S12 sets the depth of 1 in association with the group number 1 in the group information file 115, thereby setting the depth of 1 for the depth information a1 about the group with the group number 1.

In step S13, the management information setting program 112 sets an initial value of 2 for a variable N.

In step S14, the management information setting program 112 determines whether or not a group N exists based on the number of content file number ranges in the group information file 115 as well as on the group numbers attached to the groups in step S11. If the group N is found to exist in step S14, step S15 is reached. In step S15, the management information setting program 112 reads depth information a(N−1) about a group (N−1). Illustratively, the management information setting program 112 in step S15 reads from the group information file 115 the depth stored in association with a group number (N−1), thereby retrieving depth information a(N−1) about the group (N−1).

For example, if step S15 is carried out for the first time, then N is 2. In that case, depth information a1 representative of the depth of 1 about the group 1 is retrieved.

In step S16, the management information setting program 112 acquires a depth of b to be set for the depth information about the group N. Illustratively, the management information setting program 112 in step S16 acquires the depth of b based on a signal from the input unit 26 reflecting the user's operation. Alternatively, the management information setting program 112 obtains in step S16 the depth of b by acquiring a predetermined depth. For example, the depth of 1 may be set in advance as the default depth b for the management information setting program 112.

In step S17, the management information setting program 112 determines whether or not the depth of b is at least 1 and not more than a(N−1)+1. If the result of the determination in step S17 is affirmative, then step S18 is reached. In step S18, the management information setting program 112 sets the depth of b for depth information aN about the group with the group number N.

The determination in step S17, i.e., a determination on whether the depth of b is at least 1 and not more than a(N−1)+1, is designed to place the group N either as a child of the group (N−1) or as an ancestor of that group (N−1). As a result of the determination in step S17, the group N will not be placed more than two layers below the group (N−1) or below the ancestor of that group (N−1). For example, because the group 1 has the depth of 1, the group 2 has a depth of either 1 or 2. This prevents the group 2 from having a depth of 3 or more.

Illustratively, the management information setting program 112 in step S18 sets the depth of b in association with the group number N in the group information file 115. This sets the depth of b for the depth information aN about the group with the group number N.

In step S19, the management information setting program 112 increments N by 1. Step S19 is followed by step S14 from which the subsequent steps described above are repeated on the basis of the incremented N value.

If the result of the determination in step S17 is negative, i.e., if the depth of b is found less than 1 or in excess of a(N−1)+1, then the acquired depth b is not suitable for the tree structure. In that case, step S20 is reached and the management information setting program 112 causes the output unit 27 to display an error message. Step S20 is followed by step S16 from which the subsequent steps are repeated until an appropriate depth of b is acquired.

If the group N is not found to exist in step S14, there is no need to attach depth information to the group N. The depth information has now been attached to all groups that exist, and the process of FIG. 8 is brought to an end.

The foregoing description has shown how depth information is attached to each of the groups involved so that each group is given its proper depth in the tree structure.

What follows is a description of how a tree of groups is generated on the basis of depth information attached to the groups involved. Each of the groups constitutes a node in the generated tree.

Figure 9:
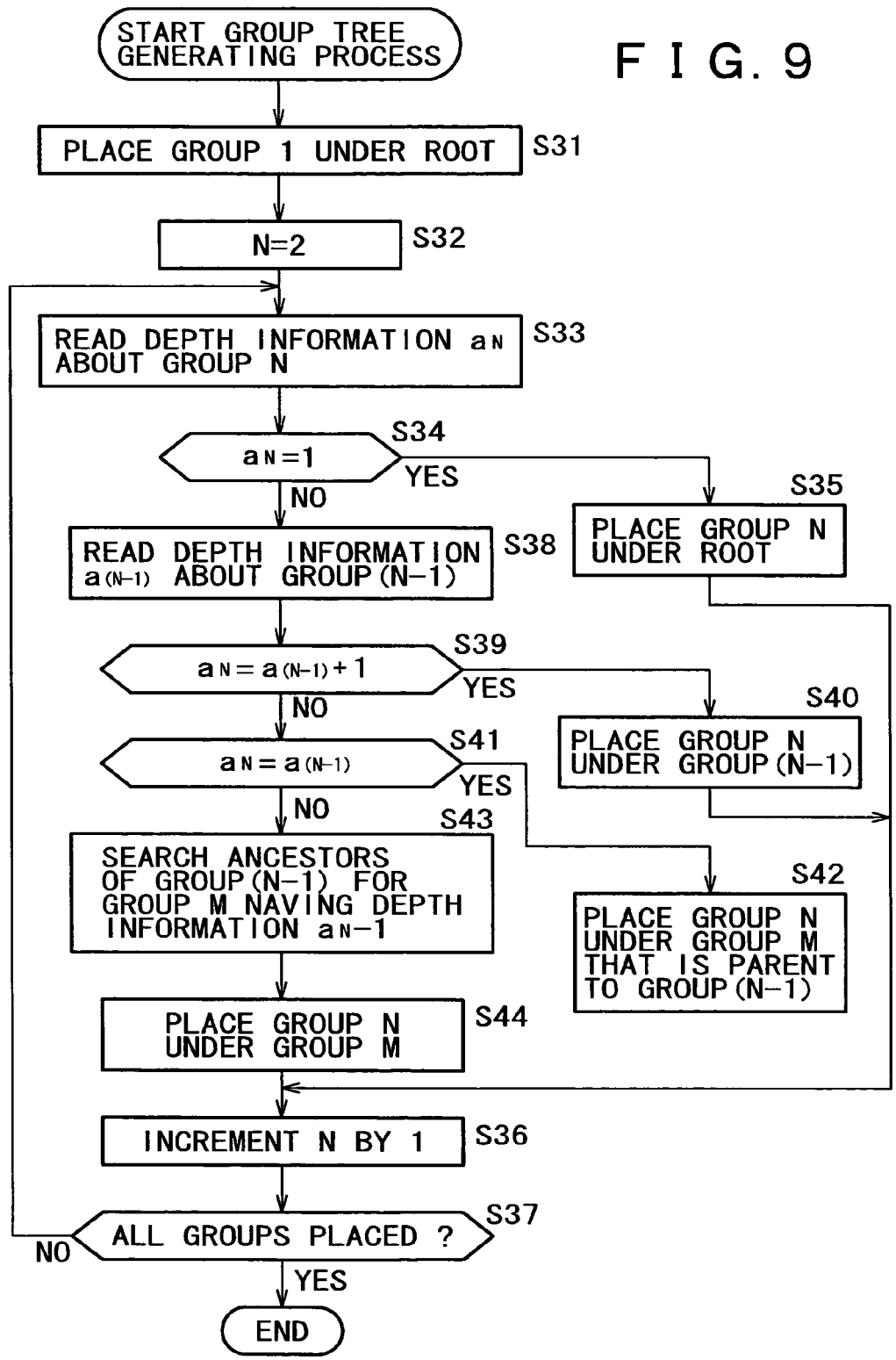
FIG. 9 is a flowchart of steps constituting a group tree generating process.

FIG. 9 is a flowchart of steps constituting a group tree generating process to be performed by the personal computer 1 running the file management program 101. In step S31, the display control program 111 in the file management program 101 places a group 1 under a root. That is, the group 1 is turned into a child of the root.

Suppose that a first node is connected with a second node and that the second node is deeper than the first node by one layer, i.e., that the first and the second nodes are directly connected and that the second node is in the layer immediately below the first node. In that case, the second node is said to be a child of the first node, and the first node is said to be a parent to the second node. If the second node is connected directly to the first node, or if the second node is connected to the first node via a plurality of nodes and if the second node is placed deeper than the first node, then the second node is said to be a descendant of the first node and the first node is said to be an ancestor of the second node. These definitions of the child, parent, descendant, and ancestor are the same as those of the typical tree structure in the graph theory.

Illustratively, the display control program 111 places the group 1 under the root by writing to the group tree data file 116 information indicating that the group 1 is a child of the root.

The information indicating a parent-child relationship can be provided in the form of a pointer. More specifically, the information indicating that the group N is a child of the root may be given in the form of a pointer pointing to the group N from the root.

In step S32, the display control program 111 sets an initial value of 2 for a variable N. In step S33, the display control program 111 reads depth information aN about the group N. Illustratively, the display control program 111 in step S33 reads from the group information file 115 a depth of aN stored in association with a group number N.

Figure 10:
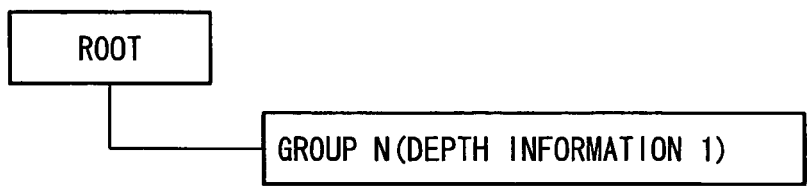
FIG. 10 is an explanatory view depicting how a group is typically placed.

In step S34, the display control program 111 determines whether or not the depth information aN about the group N is 1. If the depth information aN is found to be 1, then step S35 is reached because the group N is a child of the root. In step S35, as shown in FIG. 10, the display control program 111 places the group N under the root, and goes to step S36. Illustratively, the display control program 111 in step S35 places the group N under the root by storing to the group tree data file 116 information indicating that the group N is a child of the root.

In step S36, the display control program 111 increments the variable N by 1. In step S37, the display control program 111 determines whether or not all groups have been suitably placed on the basis of the number of groups as well as the value of the variable N. If not all groups have been placed yet, step S33 is reached again and the subsequent steps are carried out on the next group to be placed.

If in step S34 the depth information aN is not found to be 1, then step S38 is reached. In step S38, the display control program 111 reads depth information a(N−1) about a group (N−1) that precedes the group N. Illustratively, the display control program 111 in step S38 reads from the group information file 115 the depth information a(N−1) stored in association with a group number (N−1).

In step S39, the display control program 111 determines whether or not the depth information aN about the group N is equal to depth information a(N−1)+1 about the group (N−1). If the depth information aN is found equal to the depth information a(N−1)+1, that means the group (N−1) is one layer above the group N and that the group N is a child of the group (N−1). In that case, step S40 is reached. In step S40, the group N is placed under the group (N−1). Step S40 is followed by step S36 in which the variable N is incremented by 1 and the subsequent steps are repeated. Illustratively, the display control program 111 in step S40 places the group N under the group (N−1) by writing to the group tree data file 116 information indicating that the group N is a child of the group (N−1).

Figure 11:
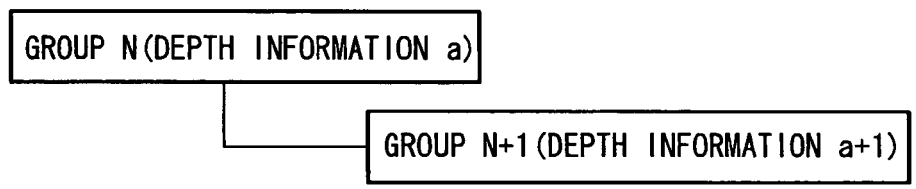
FIG. 11 is an explanatory view illustrating how groups are typically placed.

That is, as shown in FIG. 11, the group N with the depth information a is a parent to a group N+1 with depth information a+1. Given the difference in magnitude between the two sets of depth information, the group N+1 is placed under the group N.

If in step S39 the depth information aN about the group N is not found equal to the depth information a(N−1)+1 about the group (N−1), then step S41 is reached. In step S41, the display control program 111 determines whether or not the depth information aN about the group N is equal to the depth information a(N−1) about the group (N−1). If the result of the determination in step S41 is affirmative, that means the group N is in the same layer as the group (N−1) and that the parent of the group N is the same as that of the group (N−1). In that case, step S41 is followed by step S42.

In step S42, the display control program 111 places the group N under a group M that is parent to the group (N−1). Step S42 is followed by step S36 in which the variable N is incremented by 1 and the subsequent steps are repeated. Illustratively, the display control program 111 in step S42 searches for a depth of aN−1 through the depths of groups with their group numbers ranging from (N−2) to 1 in the group information file 115. When the group with the depth of aN−1 is detected, that group is taken as the group M. That is, the group M has the group number closest to the number (N−1) among the groups for which the depth of aN−1 is set.

The display control program 111 then places the group N under the group M by writing to the group tree data file 116 information indicating that the group N is a child of the group M.

Figure 12:
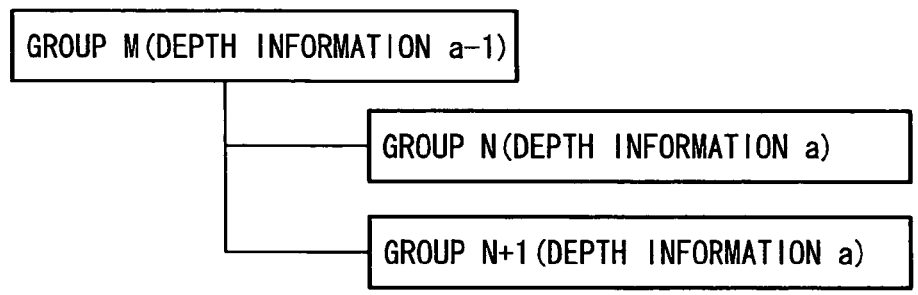
FIG. 12 is another explanatory view indicating how groups are typically placed.

That is, as shown in FIG. 12, the group M with depth information a-1 is parent to both the group N with the depth information a and the group N+1 with the depth information a. Given the difference in magnitude between the two sets of depth information, the group N+1 is placed under the group M with the depth information a-1.

If in step S41 the depth information aN about the group N is not found equal to the depth information a(N−1) about the group (N−1), that means aN is less than a(N−1) and that the group N is in a layer higher than the group (N−1). In that case, step S41 is followed by step S43. In step S43, the display control program 111 searches the ancestors of the group (N−1) for the group M having the depth information aN−1. Illustratively, the display control program 111 searches for the depth aN−1 through the depths of the groups with their group numbers ranging from (N−2) to 1 in the group information file 115. When the group with the depth of aN−1 is detected, that group is taken as the group M. That is, the group M has the group number closest to the number (N−1) among the groups for which the depth of aN−1 is set.

In step S44, the display control program 111 places the group N under the detected group M. Step S44 is followed by step S36 in which the variable N is incremented by 1 and the subsequent steps are repeated. Illustratively, the display control program 111 in step S44 places the group N under the group M by storing to the group tree data file 116 information indicating that the group N is a child of the group M.

Figure 13:
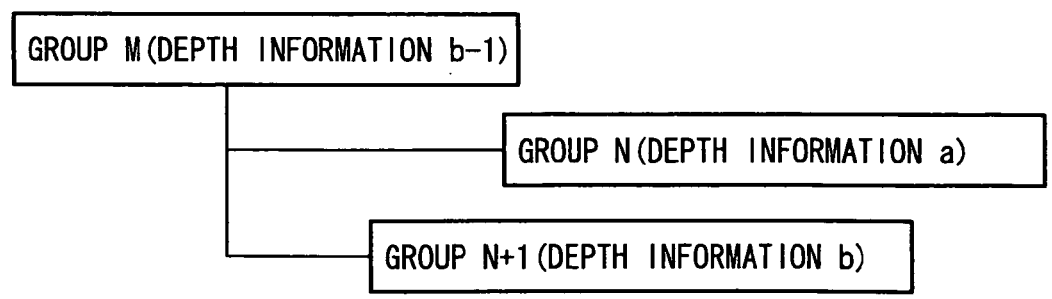
FIG. 13 is another explanatory view sketching how groups are typically placed.

That is, as shown in FIG. 13, if the group N+1 has the depth information b, then the group M with the depth information b-1 and an ancestor of the group N with the depth information a is parent to the group N+1 with the depth information b. In this case, the group N+1 with the depth information b is placed under the group M with the depth information b-1.

As described, the personal computer 1 running the file management program 101 can generate a tree of groups based on the depth information set for these groups.

Figure 14:
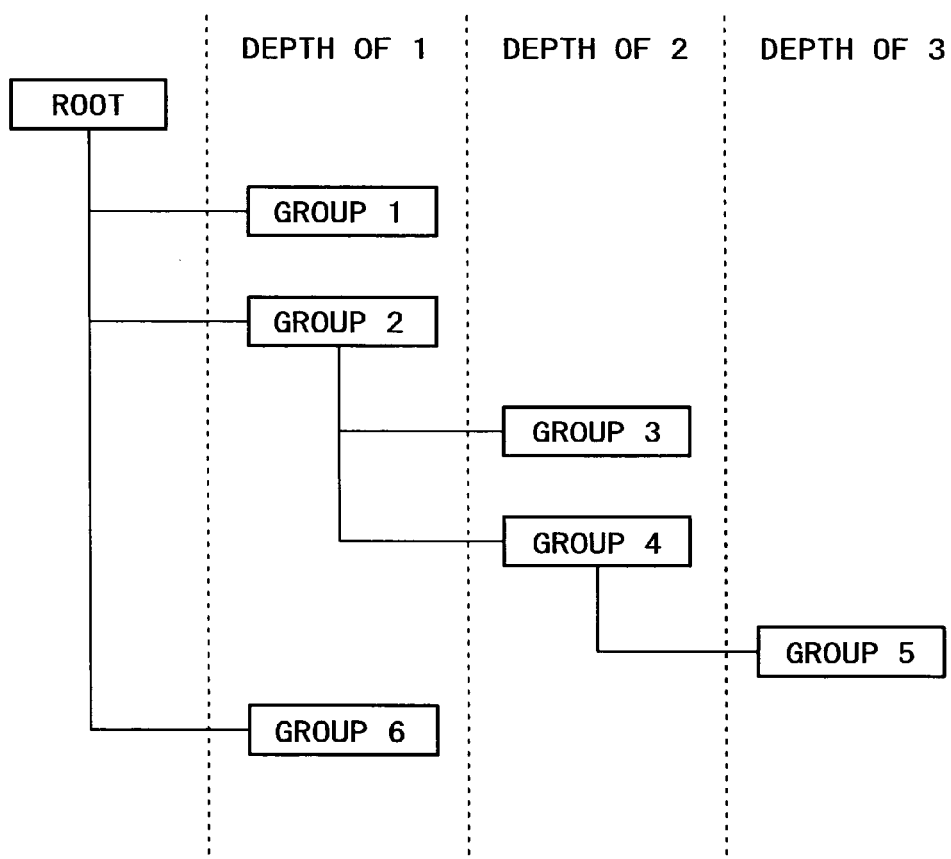
FIG. 14 is another explanatory view outlining how groups are typically placed.

Illustratively, suppose that groups 1 and 2 have depth information 1, groups 3 and 4 have depth information 2, a group 5 has depth information 3, and a group 6 has the depth information 1. In that case, as shown in FIG. 14, the groups 2 and 6 are placed under the root, the groups 3 and 4 under the group 2, and the group 5 under the group 4.

In the group tree generated by the personal computer 1, the difference in depth between a child and a parent is always 1 and never 2 or more. For example, as depicted in FIG. 15, the group 1 will not have a depth of 2 or more; the group 3, a child of the group 2 having the depth of 1, will not have a depth of 3 or more.

As described, it is possible to generate a tree of groups on the basis of the depth information attached to the groups in accordance with predetermined rules. Resorting to the generated tree permits efficient management of the groups involved.

Where the maximum depth of the tree is small relative to the number of groups, the amount of the processing to be done rises in substantially linear relation with the growing group count. It follows that even if the number of groups is large, a tree of the groups can be generated by keeping any increase in process load minimal.

Using content file numbers in conjunction with content names makes it possible to list the content names in a single row on display. This format is highly compatible with an existing format in which only track names are displayed.

Figure 16:
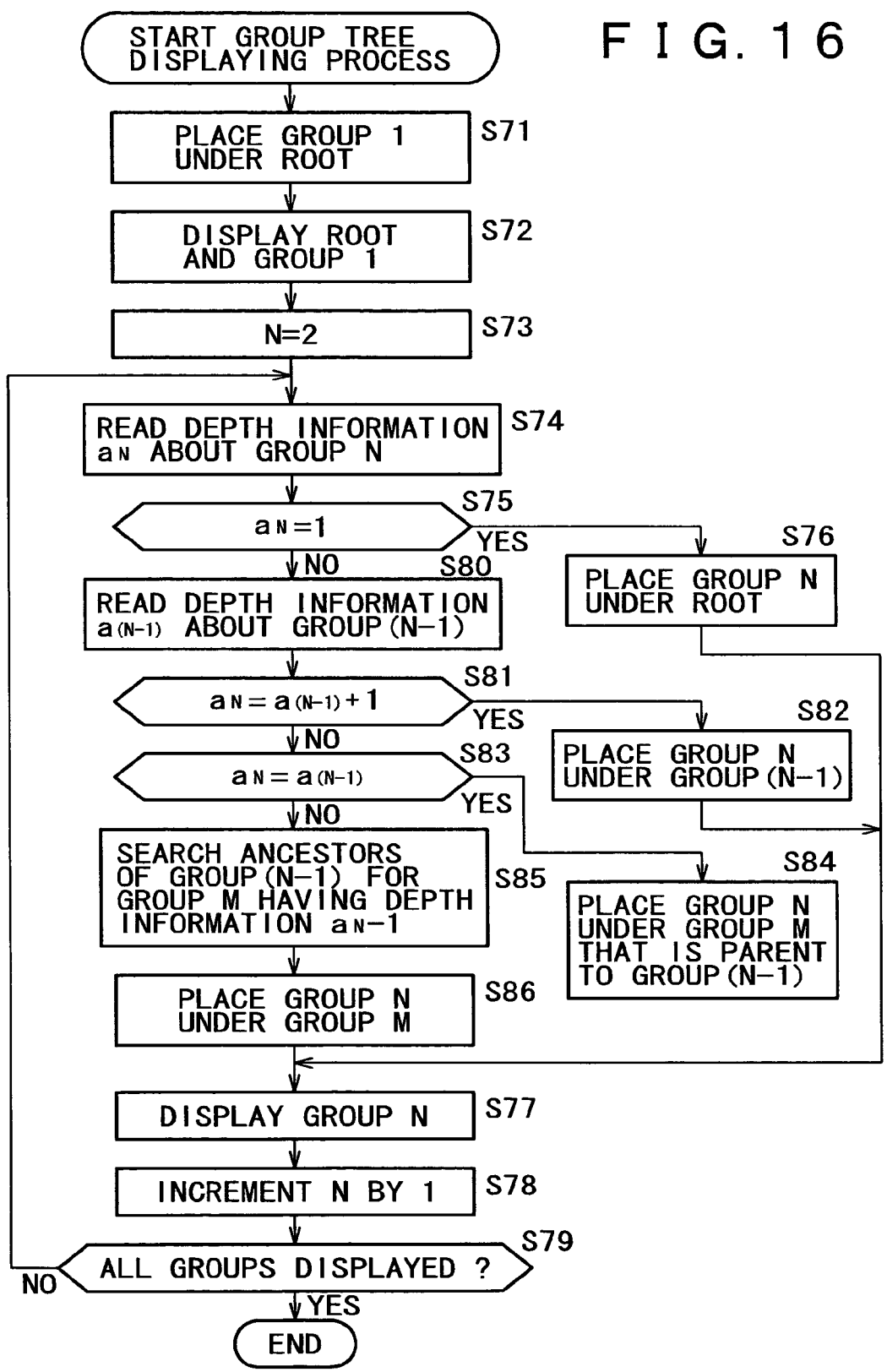
FIG. 16 is a flowchart of steps constituting a group tree displaying process.

FIG. 16 is a flowchart of steps constituting a group tree displaying process to be performed by the personal computer 11 running the file management program 101. In FIG. 71, the display control program 111 in the file management program 101 places a group 1 under a root. In step S72, the display control program 111 displays the root and the group 1. Illustratively, the display control program 111 in step S72 causes the output unit 77 to display an image of the root along with the name of the group 1 as a child of the root.

In step S73, the display control program 111 sets an initial value of 2 for a variable N. In step S74, the display control program 111 reads depth information aN about a group N. Illustratively, the display control program 111 in step S74 reads from the group information file 115 a depth of aN stored in association with a group number N.

In step S75, the display control program 111 determines whether or not the depth information aN about the group N is 1. If the depth information aN is found to be 1, that means the group N is a child of the root. In that case, step S76 is reached in which the group N is placed under the root. Step S76 is followed by step S77.

In step S77, the display control program 111 displays the group N. Illustratively, the display control program 111 in step S77 causes the output unit 77 to display the name of the group N in a manner clearly indicating to the user the relation with the parent (node). For example, in step S77 following the execution of step S76, the display control program 111 causes the output unit 77 to display the name of the group N in a manner indicating that the group N is a child of the root. More specifically, the display control program 111 displays on the output unit 77 an image of the root in the top left corner in conjunction with the name of the group N in the bottom right corner, the root image and the group name being connected by lines.

In step S78, the display control program 111 increments the variable N by 1. In step S79, the display control program 111 determines whether or not all groups have been suitably placed on the basis of the number of groups as well as the value of the variable N. If not all groups have been placed yet, step S74 is reached again and the subsequent steps are carried out on the next group to be placed.

If in step S75 the depth information aN is not found to be 1, then step S80 is reached. In step S80, the display control program 111 reads depth information a(N−1) about a group (N−1) that precedes the group N. Illustratively, the display control program 111 in step S80 reads from the group information file 115 the depth information a(N−1) stored in association with a group number (N−1).

In step S81, the display control program 111 determines whether or not the depth information aN about the group N is equal to depth information a(N−1)+1 about the group (N−1). If the depth information aN is found equal to the depth information a(N−1)+1, that means the group N is a child of the group (N−1). In that case, step S81 is followed by step S82 in which the group N is placed under the group (N−1). After step S82, step S77 is reached in which the group N is displayed, and the subsequent steps are repeated. For example, in step S77 following the execution of step S82, the display control program 111 causes the output unit 77 to display the group N in a manner indicating that the group N is a child of the group (N−1).

If in step S81 the depth information aN about the group N is not found equal to the depth information a(N−1)+1 about the group (N−1), then step S83 is reached. In step S83, the display control program 111 determines whether or not the depth information aN about the group N is equal to the depth information a(N−1) about the group (N−1). If the result of the determination in step S83 is affirmative, that means the group N is in the same layer as the group (N−1) and that the parent of the group N is the same as that of the group (N−1). In that case, step S83 is followed by step S84.

In step S84, the display control program 111 places the group N under a group M that is parent to the group (N−1). Step S84 is followed by step S77 in which the group N is displayed and the subsequent steps are repeated. Illustratively, the display control program 111 in step S84 searches for a depth of aN−1 through the depths of groups with their group numbers ranging from (N−2) to 1 in the group information file 115. When the group with the depth of aN−1 is detected, that group is taken as the group M. That is, the group M has the group number closest to the number (N−1) among the groups for which the depth of aN−1 is set.

In step S77 following the execution of step S84, the display control program 111 causes the output unit 77 to display the group N in a manner indicating that the group N is a child of the group M.

If in step S83 the depth information aN about the group N is not found equal to the depth information a(N−1) about the group (N−1), that means aN is less than a(N−1) and that the group N is in a layer higher than the group (N−1)(i.e., the group N is closer to the root than the group (N−1)). In that case, step S83 is followed by step S85. In step S85, the display control program 111 searches the ancestors of the group (N−1) for the group M having the depth information aN−1.

Illustratively, the display control program 111 searches for the depth aN−1 through the depths of the groups with their group numbers ranging from (N−2) to 1 in the group information file 115. When the group with the depth of aN−1 is detected, that group is taken as the group M. That is, the group M has the group number closest to the number (N−1) among the groups for which the depth of aN−1 is set.

In step S86, the display control program 111 places the group N under the detected group M. Step S86 is followed by step S77 in which the group N is displayed, and the subsequent steps are repeated.

In step S77 following the execution of step S86, the display control program 111 causes the output unit 77 to display the group N in a manner indicating that the group N is a child of the group M.

As described, the personal computer 1 running the file management program 101 can display a tree of groups based on the depth information set for the groups involved. In such a case, the group tree data file 116 may or may not be generated.

According to the process described above with reference to FIG. 16, a tree of groups is displayed solely on the basis of a series of group numbers made up of natural numbers and the depth information corresponding to the group numbers. That is, the group tree can be displayed without recourse to relatively large amount of data such as pointers representative of a tree structure. Thus portable apparatuses and similar equipment having small storage areas and low levels of processing power can still display a group tree.

The personal computer 1 and the portable players 2 and 3 are capable of changing display modes in keeping with their throughput or display capacity, particularly when displaying information about content items and groups. To implement display mode change requires preparing a tree of groups in advance and storing data representative of the generated group tree into the group tree data file 116.

The personal computer 1 can change its display mode, i.e., the manner in which to display content-related information, in accordance with the user's instructions or in keeping with the power of the display device connected to the computer. How the personal computer 1 works in such cases is described below with reference to the flowchart of FIG. 17 showing a displaying process to be performed by the computer 1 running the file management program 101.

In step S101, the display control program 111 acquires designation of a display mode. Illustratively, the display control program 111 in step S101 acquires designation of the display mode by receiving a signal from the input unit 26 reflecting the user's operation. Alternatively, the display control program 111 in step S101 acquires designation of the display mode by reading a predetermined mode. The predetermined mode may be a mode that is compatible illustratively with the display capacity of the output unit 27 or 77.

In step S102, the display control program 111 determines whether or not a track display mode is designated on the basis of the acquired display mode designation. If the track display mode is found to be designated, step S103 is reached and a track displaying process is performed. Thereafter the whole displaying process is terminated.

Figure 19:
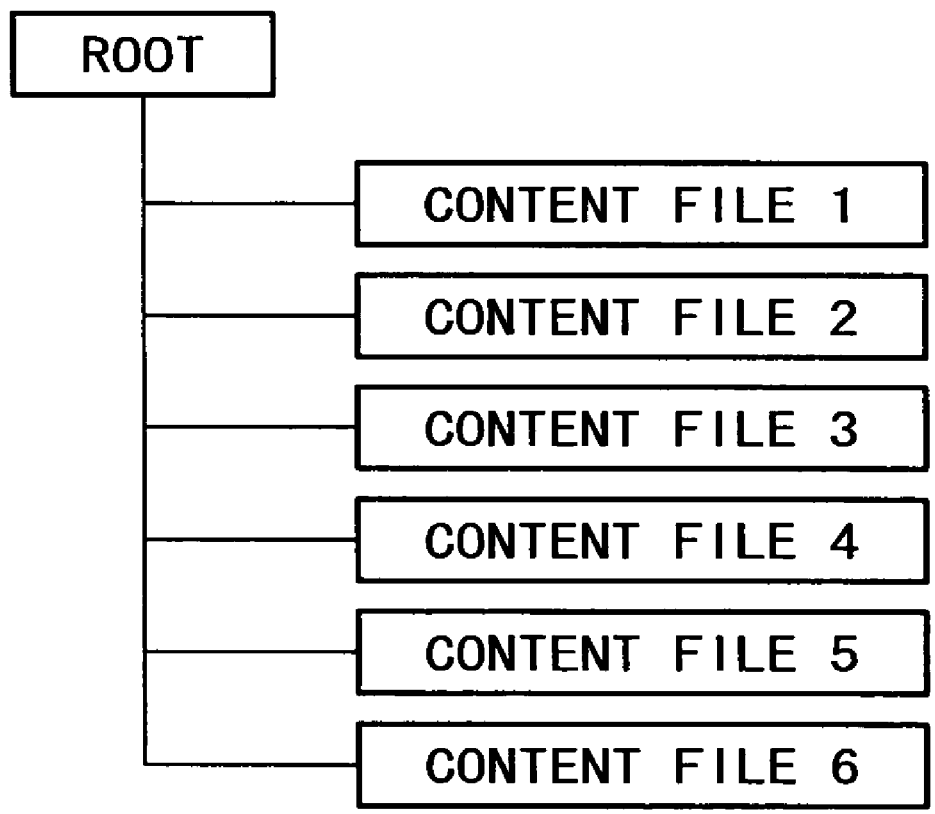
FIG. 19 is a schematic view depicting how tracks are typically displayed.

Suppose that, as shown in FIG. 18, groups are arranged into a tree structure so that groups 1, 2 and 5 are placed under the root and groups 3 and 4 under the group 2; and that a content file 1 belongs to the group 1, a content file 2 to the group 2, content files 3 and 4 to the group 4, and content files 5 and 6 to the group 5. In that case, as depicted in FIG. 19, track display involves displaying all content names corresponding to the content files 117 in order of content file numbers in a single layer. The content file numbers illustratively represent the order in which the tracks are reproduced. In the case of track display, group-related information such as group names will not be displayed. Details of the track displaying process will be discussed later.

If in step S102 the track display mode is not found to be designated, step S104 is reached. In step S104, the display control program 111 determines whether or not a group display mode is designated on the basis of the acquired display mode designation. If the group display mode is found to be designated, step S105 is reached and a group displaying process is performed. After that, the whole displaying process is terminated.

Figure 20:
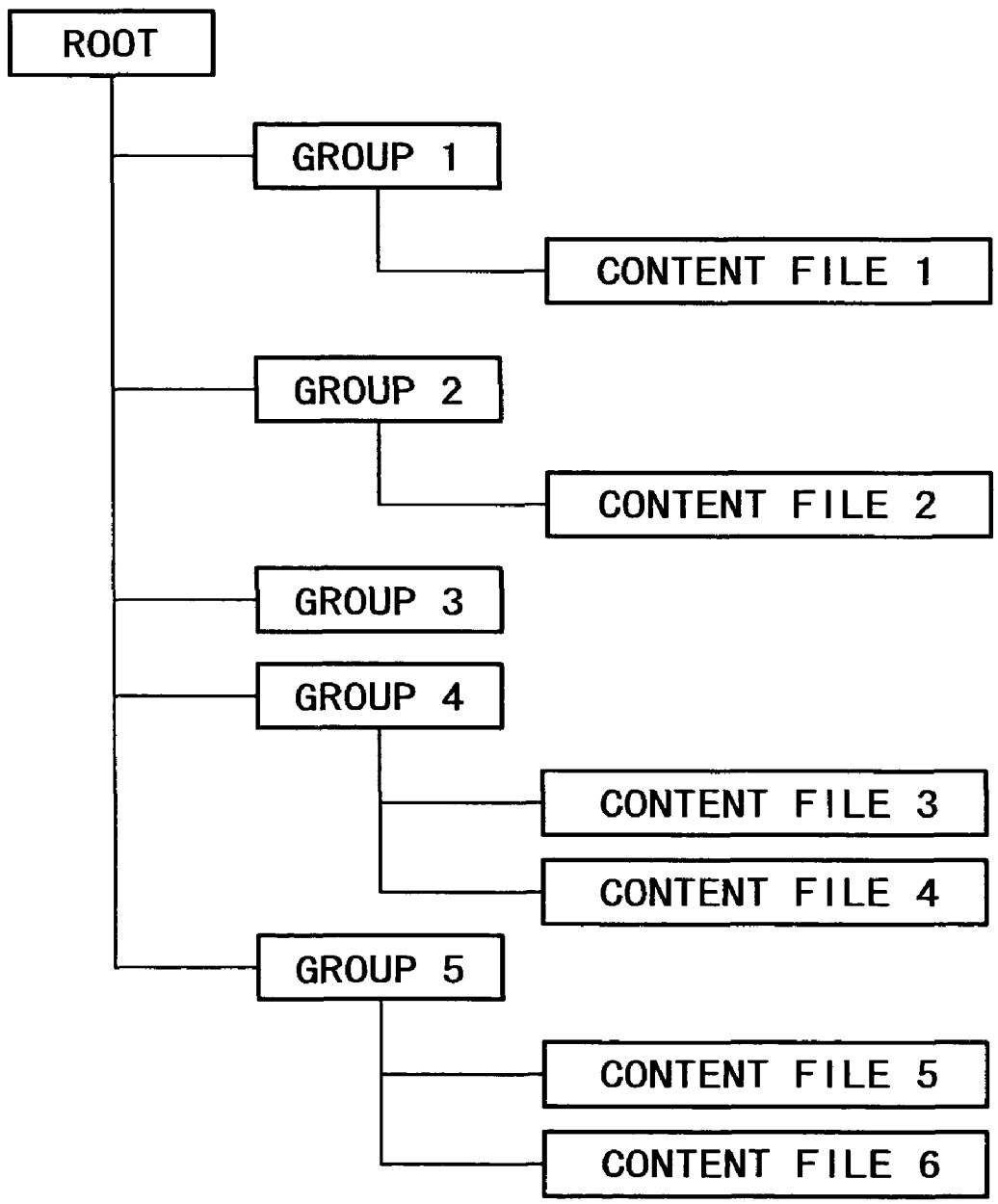
FIG. 20 is a schematic view illustrating how groups are typically displayed.

If the group tree is structured as shown in FIG. 18, then group display involves displaying all group names in order of group numbers in a single layer while displaying the content names arranged corresponding to the group names in order of content file numbers as depicted in FIG. 20. The group numbers illustratively represent the order in which the groups are reproduced. In the case of group display, no display is made of information related to group depths. Details of the group displaying process will be discussed later.

If in step S104 the group display mode is not found to be designated, that means a group tree display mode is designated. In that case, step S106 is reached and a group tree displaying process is carried out. Thereafter the whole displaying process is brought to an end.

Figure 21:
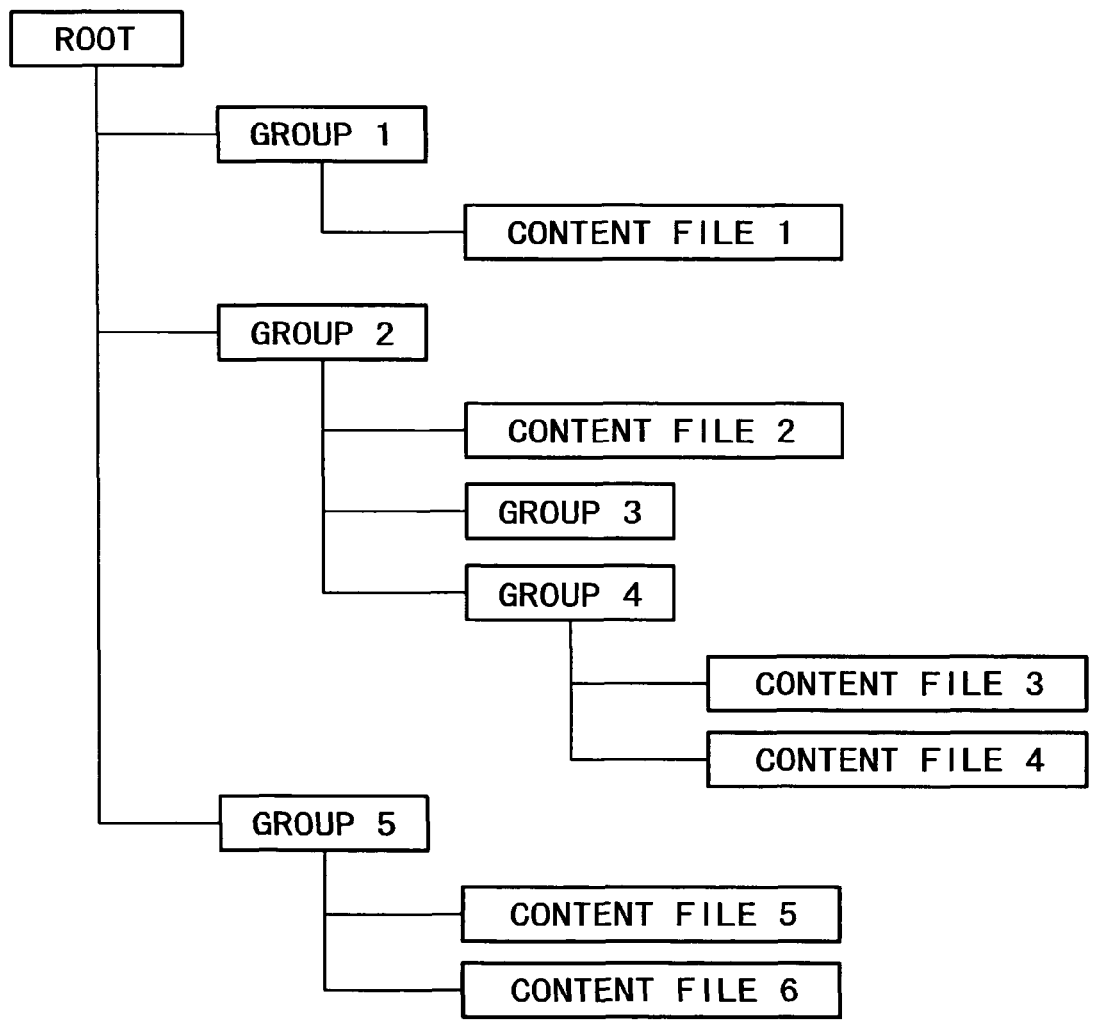
FIG. 21 is a schematic view indicating how a group tree is typically displayed.

In the case of group tree display, a hierarchical structure of the groups involved is displayed along with the content names belonging to the groups and on display in association with the groups. Illustratively, if the group tree is structured as shown in FIG. 18, then the names of the groups 1, 2 and 5 are placed under the root and the names of the groups 3 and 4 under the group 2 as illustrated in FIG. 21 giving a group tree display.

Because the content file 1 belongs to the group 1, the name of the content file 1 is display in association with the name of the group 1. Likewise, with the content file 2 belonging to the group 2, the name of the content file 2 is displayed in conjunction with the name of the group 2. With the content files 3 and 4 belonging to the group 4, the names of these two files are displayed in association with the name of the group 4. Furthermore, with the content files 5 and 6 belonging to the group 5, the names of the two files are displayed in conjunction with the name of the group 5. Details of the group tree displaying process will be discussed later.

The track displaying process, group displaying process, and group tree displaying process will now be described each in detail.

Figure 22:
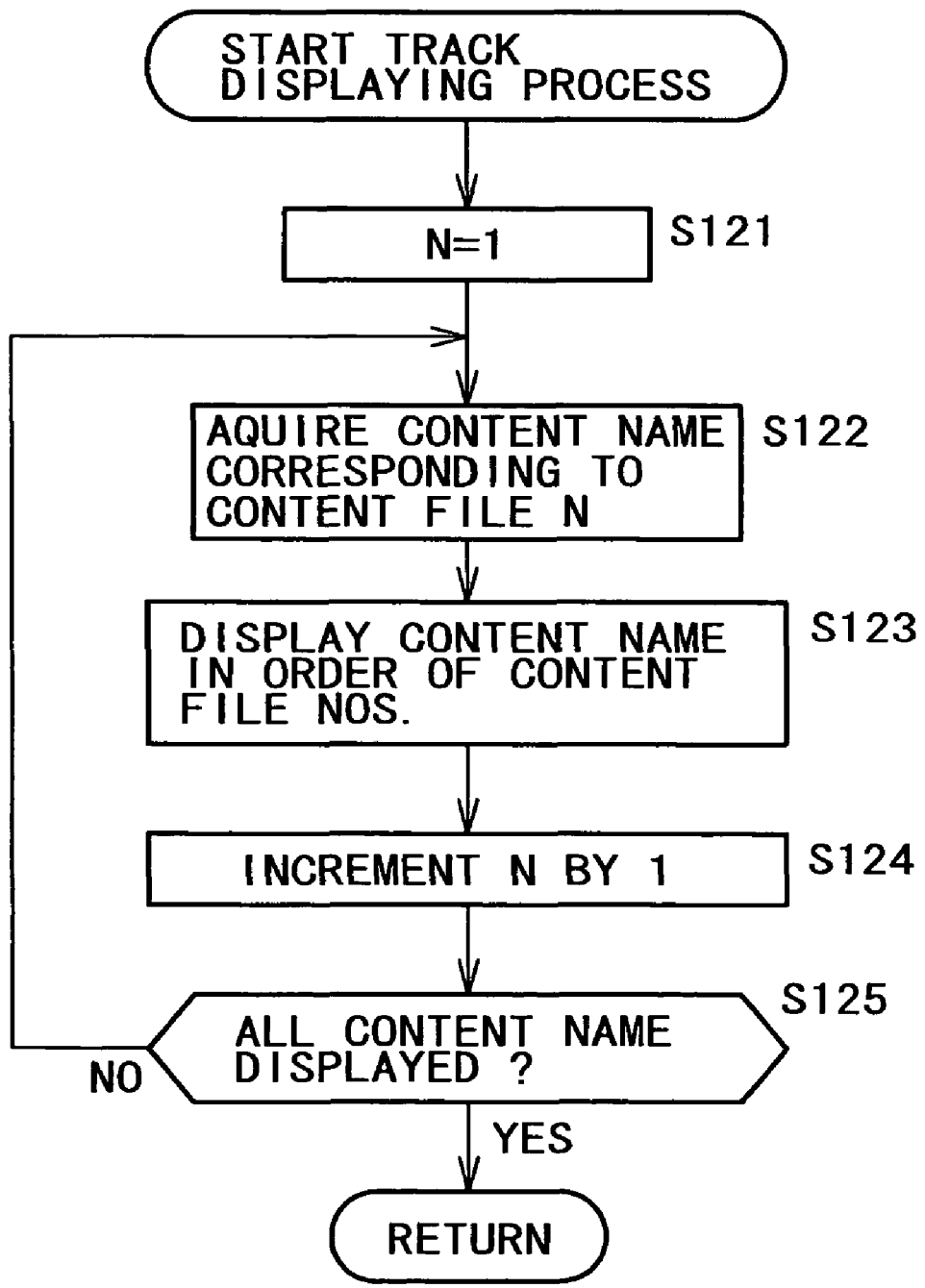
FIG. 22 is a flowchart of detailed steps constituting a track displaying process.

FIG. 22 is a flowchart of detailed steps constituting the track displaying process corresponding to step S103 of FIG. 17. In step S121 of FIG. 22, the display control program 111 sets an initial value of 1 for a variable N.

In step S122, the display control program 111 acquires the name of a content file having a content file number N, i.e., the content name corresponding to the content file N. Illustratively, the display control program 111 in step S122 reads from the content information file 114 the name of the content stored in association with the content file number N, thereby acquiring the content name corresponding to the content file N.

In step S123, the display control program 111 displays the content name in order of the content file numbers. Illustratively, the display control program 111 in step S123 causes the output unit 27 to display the content name corresponding to the content file with the content file number N in a single row under the content name corresponding to a content file with a content file number (N−1).

In step S124, the display control program 111 increments the variable N by 1. In step S125, the display control program 111 determines whether or not all content names have been displayed on the basis of the number of content files 117 and the value of the variable N. If not all content names have been displayed yet, step S122 is reached again and the subsequent steps are repeated on the next content name to be displayed. If all content names are found to have been displayed in step S125, the process is terminated.

When the content names are displayed in a single row in order of the content file numbers as described, all content names corresponding to the content files 117 are displayed in a single layer in order of the content file numbers.

Figure 23:
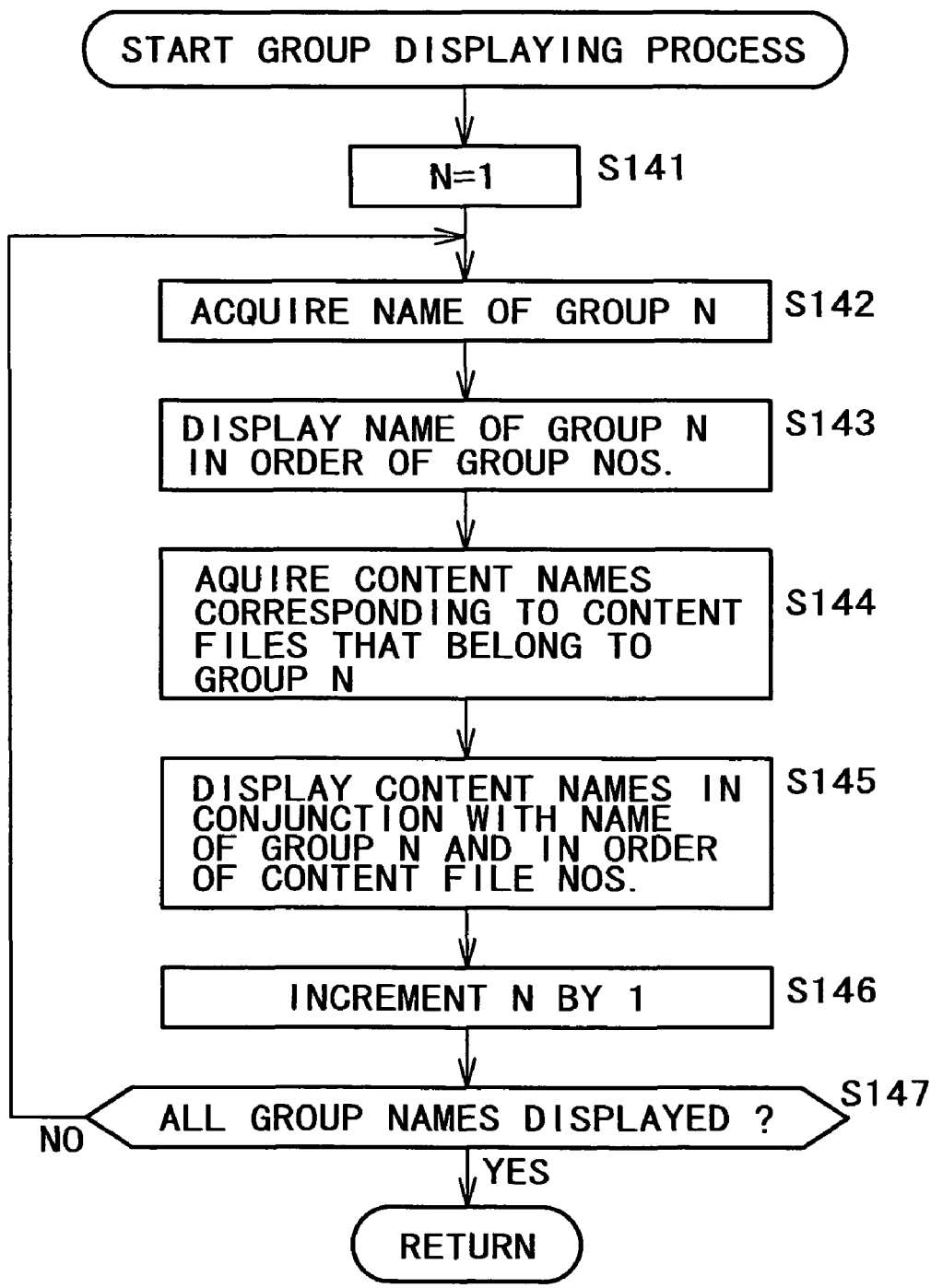
FIG. 23 is a flowchart of detailed steps constituting a group displaying process.

FIG. 23 is a flowchart of detailed steps constituting the group displaying process corresponding to step S105 of FIG. 17. In step S141 of FIG. 23, the display control program 111 sets an initial value of 1 for a variable N.

In step S142, the display control program 111 acquires the name of a group having a group number N, i.e., the name of a group N. Illustratively, the display control program 111 in step S142 acquires the name of the group with the group number N by reading from the group information file 115 the name of the group stored in association with the group number N.

In step S143, the display control program 111 displays the name of the group N in order of the group numbers. Illustratively, the display control program 111 in step S143 causes the output unit 27 to display the name of the group having the group number N in a single row under the name of a group with a group number (N−1).

In step S144, the display control program 111 acquires the names of content items associated with the group with the group number N, i.e., the names of content items corresponding to content files that belong to the group N. Illustratively, the display control program 111 in step S144 reads from the group information file 115 the range of content file numbers stored in correspondence with the group number N. The display control program 111 then reads from the content information file 114 the names of content items stored in conjunction with the content file numbers that belong to the content file number range in question, thereby acquiring the names of the content items corresponding to the content files that belong to the group with the group number N.

In step S145, the display control program 111 displays the content names in conjunction with the name of the group N and in order of the content file numbers. Illustratively, the display control program 111 in step S145 causes the output unit 27 to display, at the lower right of the group name corresponding to the group number N, the names of the content items corresponding to the content files that belong to the group N in a single row in order of the content file numbers.

The group numbers are established in ascending order in keeping with the sequence of the content file numbers. For that reason, the names of the groups and content items are displayed in order of the content file numbers in steps S143 and S145.

In step S146, the display control program 111 increments the variable N by 1. In step S147, the display control program 111 determines whether or not all group names have been displayed on the basis of the maximum group number stored in the group information file 115 as well as the value of the variable N. If not all group names are found to have been displayed yet, then step S142 is reached again and the subsequent steps are repeated on the names of the next group and of the next content items to be displayed. If all group names are found to have been displayed in step S147, the group displaying process is brought to an end.

As described, group display involves displaying the group names in a single row in order of the group numbers while displaying the content names in a single row in conjunction with the groups and in order of the content file numbers. Thus all group names are displayed in a single layer in order of the group numbers, while the names of the content items corresponding to the content files 117 furnished in conjunction with the group names are displayed in order of the content file numbers.

Figure 24:
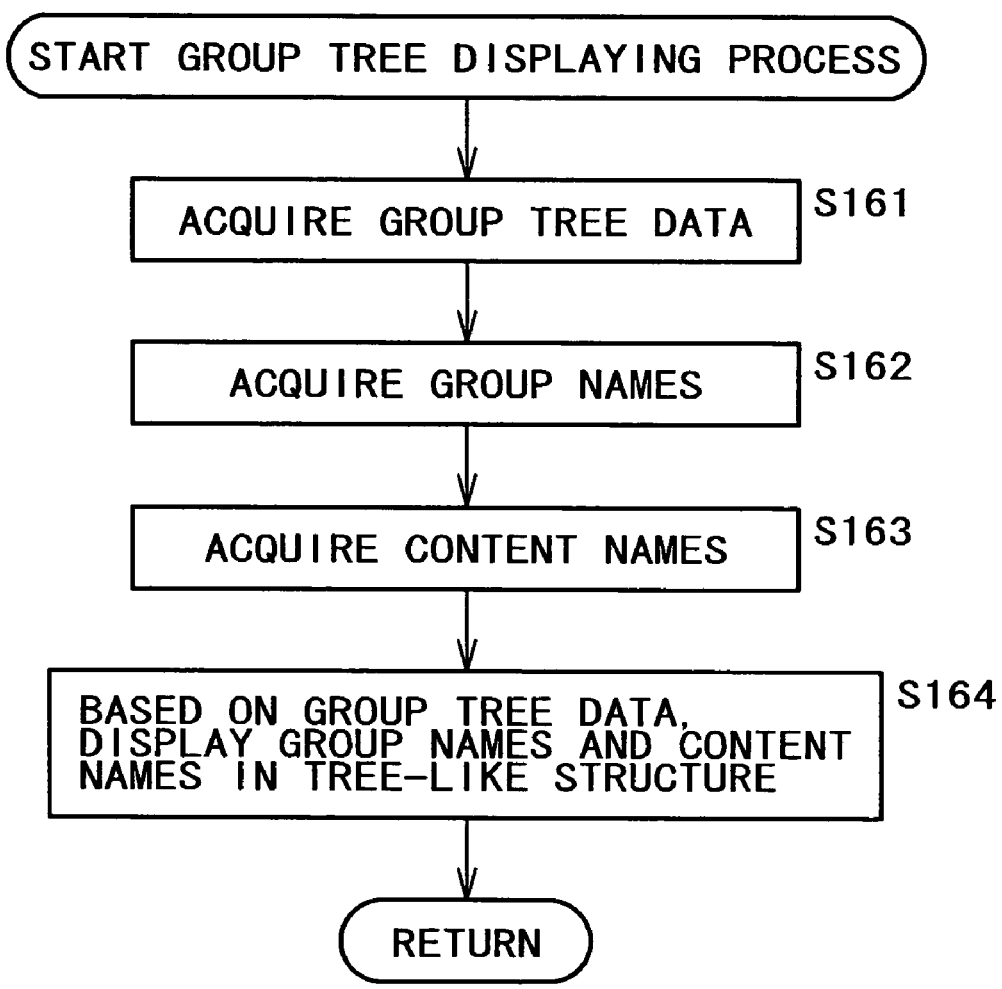
FIG. 24 is a flowchart of detailed steps constituting a group tree displaying process.

FIG. 24 is a flowchart of detailed steps constituting the group tree displaying process corresponding to step S106 of FIG. 17. In step S161 of FIG. 24, the display control program 111 acquires group tree data representative of a tree structure of the groups. Illustratively, the display control program 111 in step S161 acquires the group tree data by reading the stored data from the group tree data file 116.

The group tree data file 116 illustratively accommodates group tree data which constitute the tree structure of the groups involved and which were generated by the group tree generating process shown in FIG. 9. Alternatively, the group tree data file 116 may hold group tree data generated by some other suitable process with a view to representing the tree structure of the groups.

In step S162, the display control program 111 acquires the name of each of the groups. Illustratively, the display control program 111 in step S162 acquires the names of the groups by reading the stored group names from the group information file 115.

In step S163, the display control program 111 acquires the name of each content item. Illustratively, the display control program 111 in step S163 acquires the names of the content items by reading the stored content names from the content information file 114.

In step S164, the display control program 111 displays the group names and content names in a tree-like structure on the basis of the group tree data. This completes the group tree displaying process. Illustratively, the display control program 111 in step S164 causes the output unit 27 to display the group names and content names so that the group names are placed hierarchically in accordance with the group tree data indicative of the parent-child relationship of the groups while the names of the content items that belong to each group are placed in a manner corresponding to the group names.

That is, with the group displaying process carried out, group names are displayed in a hierarchical structure and the names of the content items that belong to each group are displayed in conjunction with the group names.

Alternatively, the group tree may be displayed by resorting to the group tree displaying process discussed above with reference to the flowchart of FIG. 16. In this case, the depth information attaching process of FIG. 8 needs to be performed before the displaying process is initiated.

As described, with the display mode suitably selected, the embodiment of this invention allows content-related information to be displayed without making modifications in the apparatus or programs being used.

For example, suppose that the CPU 71 of the portable player 2 has a low level of performance (i.e., arithmetic power) and that the output unit 77 of the player 2 has only a single-row display device on its remote controller. In that case, the portable player 2 has a predetermined track display mode selected as the default so that content names are displayed in a single layer (i.e., in a single row). As another example, suppose that the CPU 71 of the portable player 3 has a high level of performance (arithmetic power) and that the output unit 77 of the player 3 has a 2.5-inch LCD. In this case, the user may select any one of the track display mode, group display mode, and group tree display mode on the portable player 3. If the group tree display mode is selected, group names and content names are displayed in a tree structure.

The storage medium of the storage unit 78 in the portable player 2 or 3 for handling audio content is not limited to the semiconductor memory. The storage unit 78 may alternatively be equipped with a different storage medium such as a hard disk, a magneto-optical disk such as MD (Mini-Disc; trademark), or an optical disk.

The content is not limited to audio data; it may be composed alternatively of image data (still pictures or moving pictures). In such cases, the storage medium of the storage unit 78 in the portable player 2 or 3 for handling video content is not limited to the semiconductor memory. The storage unit 78 may alternatively be equipped with a different storage medium such as a hard disk, a magneto-optical disk such as MD (Mini-Disc; trademark), or an optical disk.

The storage unit 28 of the personal computer 1 may be equipped with either a built-in or a detachable storage medium. Likewise, the storage unit 78 of the portable player 2 or 3 may have either a built-in or a detachable storage medium. The storage unit 78 may be designed to accommodate significantly higher densities of information than its conventional counterpart. The recording density of the storage unit 78 is not limitative of this invention in any way.

When a recording medium (i.e., storage medium) carrying a content file 117 is loaded into the personal computer 1 or the portable player 2 or 3, the computer or player writes a content information file 114, a group information file 115, and a group tree data file 116 to the loaded recording medium (storage medium). The recorded files are then used to execute the displaying process discussed above.

The personal computer 1 and the portable players 2 and 3 may be so structured as to share among them the content information file 114, group information file 115, and group tree data file 116 in a common format. If that is the case and if a recording medium carrying the content information file 114, group information file 115, and group tree data file 116 is loaded into any one of the personal computer 1 and the portable players 2 and 3, the apparatus in question can display content-related and group-related information such as content names and group names in the same manner as the others. It is not necessary for the user to become familiar with different manners of operation on different apparatuses as long as they share the content information file 114, group information file 115, and group tree data file 116 for the same type of display. Relieved of the chores of learning to manipulate different apparatuses, the user finds it appreciably easier to handle desired content than before.

The same beneficial effects are appreciated when the content information file 114, group information file 115, and group tree data file 116 are copied or moved from one apparatus to another.

Besides its uses in portables, this invention can obviously be applied as well to stationary apparatuses such as reproducing apparatuses, recording apparatuses, and image servers.

The functions of the personal computer 1 and the portable player 2 or 3 may be implemented either by hardware or by software. That is, the block diagrams accompanying this specification may be considered either hardware block diagrams or software function block diagrams.

Although the personal computer 1 and the portable players 2 and 3 have been cited above as typical information processing apparatuses, this is not limitative of the invention. The inventive information processing apparatus need only be capable of controlling the display of content names. As such, the information processing apparatus may alternatively be a PDA, a mobile phone, a stationary recording/reproducing apparatus, or a remote controller of the stationary recording/reproducing apparatus.

When content names are displayed as described, desired content can be handled easily for use. According to the invention, a series of group numbers made up of natural numbers starting from 1 are attached to groups, and depth information 1 is attached to the group having the group number 1, In such a case, if a given group with a group number N (a natural number) has depth information "a" (also a natural number), then the depth information formed by a natural number which is at least 1 and not more than a+1 is attached to the group having the group number N+1. This method makes it possible to display content-related information in a tree-like structure by use of lower levels of processing capacity than before.

Also according to the invention, there is provided a set of data for causing a computer to generate a tree of groups, the data including a series of group numbers made up of natural numbers starting from 1, the numbers being attached to the groups; and depth information which is 1 for the group with the group number 1 and which, if a given group with a group number N (a natural number) has depth information "a" (also a natural number), then constitutes a natural number which is at least 1 and not more than a+1 representative of the depth of the group having the group number N+1 in the tree. This method allows the computer to display content-related information in a tree-like structure based on lower levels of processing capacity than before.

Also according to the invention, there is provided an information processing method whereby the designation of one of a first, a second, and a third display mode is acquired; whereby, if the first display mode is designated, then content-related information about content items is displayed in a predetermined order of the content items; whereby, if the second display mode is designated, then group-related information about groups is displayed in one layer while content-related information about the content items categorized in the groups is displayed in conjunction with the group-related information about the groups to which the content items belong; and whereby, if the third display mode is designated, then either the group-related information or the content-related information is displayed in a tree-like hierarchical structure. This method allows content-related information to be displayed in the same format by different display devices or programs without making modifications in their performance or display capacity.

The series of steps and processes described above may be executed either by hardware or by software. For the software-based processing to take place, the programs constituting the software may be either incorporated beforehand in dedicated hardware of a computer or installed upon use from a suitable recording medium into a general-purpose personal computer or like apparatus capable of executing diverse functions based on the installed programs.

As shown in FIG. 2 or 3, the recording medium is offered to the user apart from the computer not only as a package medium constituted by the magnetic disk 51 or 91 (including flexible disks), optical disk 52 or 92 (including CD-ROM (Compact Disc-Read Only Memory) and DVD (Digital Versatile Disc)), magneto-optical disk 53 or 93 (including MD (Mini-Disc; trademark)), or semiconductor memory 54 or 94; but also in the form of the ROM 22 or 72, a hard disk in the recording unit 28, or a semiconductor memory in the storage unit 78, each recording medium containing the programs and incorporated beforehand in the computer.

The programs for executing the above-described processes may be installed into the computer as needed through wired or wireless communication means such as local area networks, the Internet, and digital satellite broadcasting networks by way of communication interfaces such as routers and modems.

In this specification, the steps which are stored on the recording medium and which describe the programs for execution by computer represent not only the processes that are carried out in the depicted sequence (i.e., on a time series basis) but also processes that may be performed parallelly or individually.

In this specification, the term "system" refers to an entire configuration made up of a plurality of component devices.

As many apparently different embodiments of this invention may be made without departing from the spirit and scope thereof, it is to be understood that the invention is not limited to the specific embodiments thereof except as defined in the appended claims.

What is claimed is:

1. An information processing apparatus that generates a hierarchical tree that includes a first node that is a descendant of a root of the hierarchical tree, the information processing apparatus comprising:
   generating means for placing a second node in the hierarchical tree, based on first depth information $a_{N-1}$ of the first node and second depth information b of the second node, the first node having a group number N−1, the second node having a group number N, wherein $a_{aN-1}$, b, and N−1 are natural numbers, $1 \leq b \leq a_{N-1}+1$,
   the generating means places the second node in the hierarchical tree as a child of the first node, in response to a determination that $b = a_{N-1}+1$,
   the generating means places the second node in the hierarchical tree as a child of a parent of the first node, in response to a determination that $b = a_{N-1}$, and
   the generating means places the second node in the hierarchical tree as a child of an ancestor of the first node that has depth information b−1, in response to a determination that $b < a_{N-1}$; and
   controlling means for controlling a display of the hierarchical tree.

2. The information processing apparatus according to claim 1, further comprising:
   group number attaching means for attaching the group number N−1 to the first node and the group number N to the second node; and
   depth information attaching means for attaching depth information 1 to a node of the hierarchical tree that has a group number 1, wherein the generating means places the first node as a child of the root of the hierarchical tree, in response to a determination that $a_{N-1}=1$, and the first node and the second node represent content items.

3. The information processing apparatus according to claim 2, wherein the controlling means controls the display to indicate a parent of the second node in the hierarchical tree.

4. The information processing apparatus according to claim 1, further comprising:
   acquiring means for acquiring a designation of one of a first display mode, a second display mode, and a third display mode, wherein
   the controlling means controls a display of content-related information about the first node and the second node in a predetermined order, if the first display mode is designated,
   the controlling means controls a simultaneous display of group-related information, in one row or column, and the content-related information, if the second display mode is designated, and
   the controlling means controls a display of either the group-related information or the content-related information in a hierarchy based on the hierarchical tree, if the third display mode is designated.

5. A method, implemented by an information processing apparatus, for generating a hierarchical tree that includes a first node that is a descendant of a root of the hierarchical tree, the method comprising:
   placing a second node in the hierarchical tree, based on first depth information $a_{N-1}$ of the first node and second depth information b of the second node, the first node having a group number N−1, the second node having a group number N, wherein $a_{N-1}$, b, and N−1 are natural numbers, $1 \leq b \leq a_{N-1}+1$, and
   the placing includes
     placing, with a processing unit of the information processing apparatus, the second node in the hierarchical tree as a child of the first node, in response to a determination that $b = a_{N-1}+1$,
     placing, with the processing unit of the information processing apparatus, the second node in the hierarchical tree as a child of a parent of the first node, in response to a determination that $b = a_{N-1}$, and
     placing, with the processing unit of the information processing apparatus, the second node in the hierarchical tree as a child of an ancestor of the first node that has depth information b−1, in response to a determination that $b < a_{N-1}$; and
   controlling a display of the hierarchical tree.

6. The method according to claim 5, further comprising:
   attaching the group number N−1 to the first node and the group number N to the second node, wherein the first node and the second node represent content items;
   attaching depth information 1 to a node of the hierarchical tree that has a group number 1; and
   placing the first node as a child of the root of the hierarchical tree, in response to a determination that $a_{N-1}=1$.

7. The method according to claim 6, wherein the controlling controls the display to indicate a parent of the second node in the hierarchical tree.

8. The method according to claim 5, further comprising:
   acquiring a designation of one of a first display mode, a second display mode, and a third display mode, wherein
   the controlling includes
     controlling a display of content-related information about the first node and the second node in a predetermined order, if the first display mode is designated,
     controlling a simultaneous display of group-related information, in one row or column, and the content-related information, if the second display mode is designated, and
     controlling a display of either the group-related information or the content-related information in a hierarchy based on the hierarchical tree, if the third display mode is designated.

9. A computer-readable storage medium encoded with computer executable instructions, wherein the instructions, when executed by a processing unit, cause the processing unit to generate a hierarchical tree that includes a first node that is a descendant of a root of the hierarchical tree by performing a method comprising:
   placing a second node in the hierarchical tree, based on first depth information $a_{N-1}$ of the first node and second depth information b of the second node, the first node having a group number N−1, the second node having a group number N, wherein $a_{N-1}$, b, and N−1 are natural numbers, $1 \leq b \leq a_{N-1}+1$, and the placing includes placing the second node in the hierarchical tree as a child of the first node, in response to a determination that $b=a_{N-1}+1$, placing the second node in the hierarchical tree as a child of a parent of the first node, in response to a determination that $b=a_{N-1}$, and placing the second node in the hierarchical tree as a child of an ancestor of the first node that has depth information $b-1$, in response to a determination that $b<a_{N-1}$; and controlling a display of the hierarchical tree.

10. The computer-readable storage medium according to claim 9, the method further comprising:

attaching the group number $N-1$ to the first node and the group number N to the second node, wherein the first node and the second node represent content items;

attaching depth information 1 to a node of the hierarchical tree that has a group number 1; and placing the first node as a child of the root of the hierarchical tree, in response to a determination that $a_{N-1}=1$.

11. The computer-readable storage medium according to claim 10, wherein the controlling controls the display to indicate a parent of the second node in the hierarchical tree.

12. The computer-readable storage medium according to claim 9, the method further comprising:

acquiring a designation of one of a first display mode, a second display mode, and a third display mode, wherein the controlling includes controlling a display of content-related information about the first node and the second node in a predetermined order, if the first display mode is designated, controlling a simultaneous display of group-related information, in one row or column, and the content-related information, if the second display mode is designated, and controlling a display of either the group-related information or the content-related information in a hierarchy based on the hierarchical tree, if the third display mode is designated.

13. An information processing apparatus that generates a hierarchical tree that includes a first node that is a descendant of a root of the hierarchical tree, the information processing apparatus comprising:

a processing unit that places a second node in the hierarchical tree, based on first depth information $a_{N-1}$ of the first node and second depth information b of the second node, the first node having a group number $N-1$, the second node having a group number N, wherein $a_{N-1}$, b, and $N-1$ are natural numbers, $1 \leq b \leq a_{N-1}+1$, the processing unit is configured to place the second node in the hierarchical tree as a child of the first node, in response to a determination that $b=a_{N-1}+1$, the processing unit is configured to place the second node in the hierarchical tree as a child of a parent of the first node, in response to a determination that $b=a_{N-1}$, and the processing unit is configured to place the second node in the hierarchical tree as a child of an ancestor of the first node that has depth information $b-1$, in response to a determination that $b<a_{N-1}$; and an output unit that controls a display of the hierarchical tree.

14. The information processing apparatus according to claim 13, wherein the processing unit is further configured to attach the group number $N-1$ to the first node and the group number N to the second node, the first node and the second node represent content items, the processing unit is further configured to attach depth information 1 to a node of the hierarchical tree that has a group number 1, and the processing unit is further configured to place the first node as a child of the root of the hierarchical tree, in response to a determination that $a_{N-1}=1$.

15. The information processing apparatus according to claim 14, wherein the output unit is configured to control the display to indicate a parent of the second node in the hierarchical tree.

16. The information processing apparatus according to claim 13, further comprising:

an input unit that acquires a designation of one of a first display mode, a second display mode, and a third display mode, wherein the output unit is configured to control a display of content-related information about the first node and the second node in a predetermined order, if the first display mode is designated, the output unit is configured to control a simultaneous display of group-related information, in one row or column, and the content-related information, if the second display mode is designated, and the output unit is configured to control a display of either the group-related information or the content-related information in a hierarchy based on the hierarchical tree, if the third display mode is designated.

* * * * *